US011546857B2

(12) United States Patent
Baroudi et al.

(10) Patent No.: US 11,546,857 B2
(45) Date of Patent: *Jan. 3, 2023

(54) WIRELESS SENSOR NETWORK FOR PIPELINE FLUID LEAKAGE MEASUREMENT

(71) Applicant: KING FAHD UNIVERSITY OF PETROLEUM AND MINERALS, Dhahran (SA)

(72) Inventors: Uthman Baroudi, Dhahran (SA); Abdullatif Albaseer, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,676

(22) Filed: Feb. 19, 2020

(65) Prior Publication Data
US 2020/0187123 A1 Jun. 11, 2020

Related U.S. Application Data

(63) Continuation of application No. 15/716,100, filed on Sep. 26, 2017, now Pat. No. 10,631,245.

(51) Int. Cl.
*H04W 52/02* (2009.01)
*H04W 4/70* (2018.01)
*H04L 67/12* (2022.01)
*H04W 4/38* (2018.01)
*H04W 84/18* (2009.01)

(52) U.S. Cl.
CPC ......... *H04W 52/0261* (2013.01); *H04L 67/12* (2013.01); *H04W 4/38* (2018.02); *H04W 4/70* (2018.02); *H04W 84/18* (2013.01)

(58) Field of Classification Search
CPC . H04W 52/0261; H04W 4/70; H04W 12/009; H04W 84/18; H04L 67/12
See application file for complete search history.

(56) References Cited

U.S. PATENT DOCUMENTS 6,082,193 A * 7/2000 Paulson ............... G01M 3/24
73/152.58
9,756,551 B2 * 9/2017 Daragon ............. H04L 41/0803
(Continued)

FOREIGN PATENT DOCUMENTS

| TW | 104034796 B | 9/2016 | |
|---|---|---|---|
| WO | WO 2009/112937 A1 | 9/2009 | |
| WO | WO-2009112937 A1 * | 9/2009 | ........... H04W 40/32 |
| WO | WO 2011/095884 A1 | 8/2011 | |
| WO | WO-2011095884 A1 * | 8/2011 | .......... H04W 72/121 |

OTHER PUBLICATIONS

• Elleuchi et al., "Power Aware Scheme for Water Pipeline Monitoring based on Wireless Sensor Networks" 2015 15th International Conference on Intelligent Systems Design and Applications (ISDA), Marrakech, 2015, pp. 166-172 (Year: 2015).*

(Continued)

*Primary Examiner* — Redentor Pasia
(74) *Attorney, Agent, or Firm* — Oblon, McClelland, Maier & Neustadt, L.L.P.

(57) ABSTRACT

A wireless sensor network (WSN) includes a sensor node cluster having a plurality of sensor nodes positioned along a section of a pipeline; a base station; a designated cluster head for the sensor node cluster, the designated cluster head configured to forward sensor data packets towards the base station; and a server having circuitry. The circuitry is configured to determine when the designated cluster head has a battery energy level below a predetermined level, elect a replacement cluster head for the designated cluster head when the battery energy level is below the predetermined level, and forward an energy status of the designated cluster head to the replacement cluster head.

9 Claims, 29 Drawing Sheets

(56) References Cited

U.S. PATENT DOCUMENTS

| | | | | |
|---|---|---|---|---|
| 2010/0283626 A1* | 11/2010 | Breed | ................... | G01S 7/417 |
| | | | | 340/8.1 |
| 2012/0222770 A1* | 9/2012 | Kristiansen | ........ | G01K 11/3206 |
| | | | | 138/137 |
| 2015/0154432 A1* | 6/2015 | Abedi | ............... | G06K 7/10019 |
| | | | | 340/10.1 |
| 2016/0192176 A1* | 6/2016 | Zhu | ................... | H04W 72/0413 |
| | | | | 370/329 |
| 2018/0198680 A1* | 7/2018 | Mladin | ................... | H04W 4/70 |

OTHER PUBLICATIONS

• El-Refaay et al., "Cluster Head election in Wireless Sensor Networks," 2014 10th International Conference on Information Assurance and Security, Okinawa, 2014, pp. 1-5 (Year: 2014).*

Pingting Liu, et al., "Optimization for Remote Monitoring Terrestrial Petroleum Pipeline Cathode Protection System Using Graded Network", International Journal of Smart Home, vol. 9, No. 6, 2015, pp. 51-64.

Ali M. Sadeghioon, et al., "SmartPipes: Smart Wireless Sensor Networks for Leak Detection in Water Pipelines", Journal of Sensor and Actuator Networks, vol. 3, 2014, pp. 64-78.

Mohammed S. Bensaleh, et al., "A Review on Wireless Sensor Network for Water Pipeline Monitoring Applications", IEEE International Conference on Collaboration Technologies and Systems (CTS), May 2013, pp. 128-131.

* cited by examiner

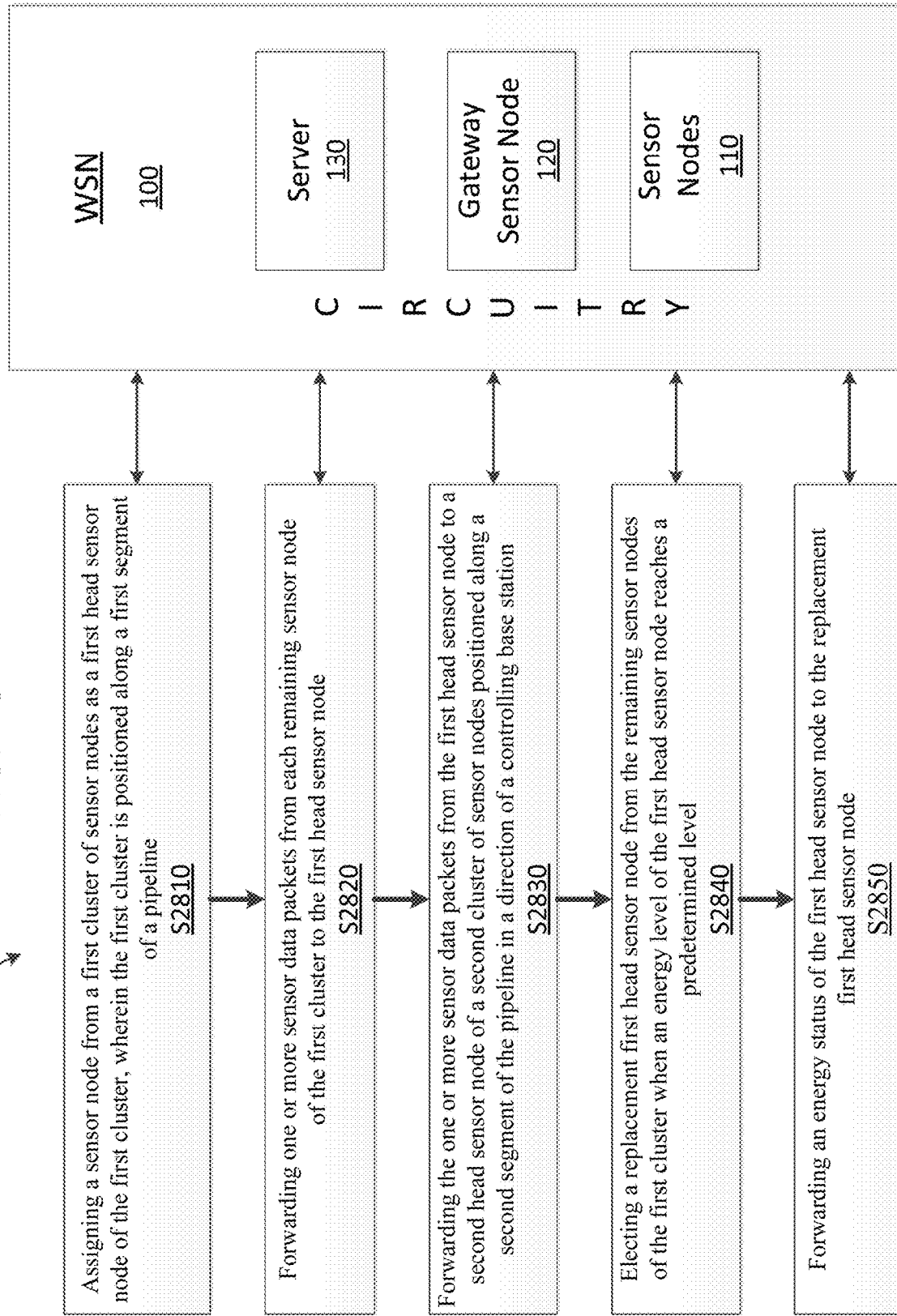

WIRELESS SENSOR NETWORK FOR PIPELINE FLUID LEAKAGE MEASUREMENT

CROSS-REFERENCE TO RELATED APPLICATIONS

The present application is a Continuation of Ser. No. 15/716,100, now allowed, having a filing date of Sep. 26, 2017.

TECHNICAL FIELD

The present invention relates to placement of sensor nodes of a wireless sensor network (WSN) along pipelines for pipeline monitoring. The pipelines can carry water, gas, oil, or other fluids.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Node clustering is a beneficial technique for applications that require a high scalability of tens to hundreds of sensor nodes. This may be due to heavier loads placed upon sensor nodes near a monitoring unit.

Typically, a long-distance pipeline distribution system is used to transport water from a water reservoir to a metropolis. For example, in Saudi Arabia, long pipelines are used to transfer water from the Shoaiba Desalination Plant in Al-Jubail, a city in eastern province of Saudi Arabia, to Riyadh. See I. Jawhar and N. Mohamed, "A hierarchical and topological classification of linear sensor networks," 2009 *Wirel. Telecommun. Symp. WTS* 2009, 2009.

Online pipeline monitoring helps maintain proper operation and also has environmental and safety advantages. Long distance pipelines and pipelines carrying critical supplies need to be continuously monitored to avoid any potential damage. However, the expected topology for pipeline placement may be linear which poses many challenges in placing sensors optimally.

In recent years, attention has been devoted on node placement in linear topology (i.e. pipeline monitoring systems). In Xue, the authors disclosed an algorithm that supports the proper selection for the relay sensor node placement and accordingly selects the transmission power levels of sensor nodes that provides the maximum lifetime. See G. Xue, "Relay node placement in wireless sensor networks for pipeline inspection," *Am. Control Conf.*, vol. 13, no. 7, pp. 5905-5910, 2013. However, these studies have not taken into consideration sudden damage scenarios. The monitoring in this case is only temporary.

Similarly, Guo et al. have studied equal-power and equal-distance node placement schemes. Two heuristics were disclosed for sensor node placement with a view towards improving the lifetime of the network by proposing an evenly consumed power model, which increases the number of sensor nodes closer to the base station and configures these sensor nodes to carry the data at lower power. See Y. Guo, F. Kong, D. Zhu, A. S. Tosun, and Q. Deng, "Sensor Placement for Lifetime Maximization in Monitoring Oil Pipelines," *Proc. 1st ACM/IEEE Int. Conf. Cyber-Physical Syst.—ICCPS '10*, pp. 61-68, 2010.

Djame et al. took advantage of energy harvesting capabilities. See D. Djenouri and M. Bagaa, "Energy harvesting aware relay node addition for power-efficient coverage in wireless sensor networks," in *IEEE International Conference on Communications*, 2015, vol. 2015—Septe, pp. 86-91. Generally, it was proposed to use harvesting-enabled sensor nodes for only relaying the packets and non-harvesting sensor nodes for sensing and transmitting their readings to relay sensor nodes.

In relation to node placement on pipeline monitoring, a non-uniform scheme called linearly decreasing distance (LDD) has been presented by Alnuem. See M. Alnuem, "Performance Analysis of Node Placement in Linear Wireless Sensor Networks," vol. 5, no. 1, pp. 1-8, 2014. LDD gradually reduces the distance among sensor nodes, wherein the sensor nodes are placed near the gateway.

In Cheng et al., a constrained multivariable nonlinear programming problem has been formulated. See P. Cheng and C. Chuah, "Energy-aware Node Placement in Wireless Sensor Networks," pp. 3210-3214, 2004. The results show that the performance of the optimal node placement strategies is better than uniform node placement strategies.

Alduraibi et al have studied the coverage problem when the event detectability varies with proximity to the sensor node and when some desired level of sensing fidelity is to be maintained. See F. Alduraibi, N. Lasla, and M. Younis, "Coverage-based Node Placement Optimization in Wireless Sensor Network with Linear Topology," 2016. Three optimization models have been presented to determine the node density.

Node placement in WSNs has been widely investigated. However, only a few studies have been devoted to pipeline applications where the sensor nodes are deployed linearly. Moreover, few of these studies have adopted a realistic power model without considering all-discrete power levels. In addition, most of the studies use greedy heuristic approaches which increase the density of sensor nodes with lower power levels nearest to the base station (BS). Also, all sensor nodes are responsible for forwarding the data packets towards the BS all the time. Moreover, these solutions do not introduce the reliable communication in a practical manner because the access can only be one way. In addition, most of the previous studies did not consider the required fidelity of the sensor nodes.

SUMMARY

A clustering approach called Equal Distance Equal Members (EDEM) clusters the sensor nodes of a wireless sensor network (WSN) based on their power levels and their required fidelity. See Uthman Baroudi, "Performance Evaluation of Node Placement Schemes for Water Pipeline Monitoring," chapter 1, 2017, incorporated herein by reference in its entirety. This approach balances the loads among the sensor nodes.

In one embodiment, a method of sensor node data transfer includes assigning a sensor node from a first cluster of sensor nodes as a first head sensor node of the first cluster, wherein the first cluster is positioned along a first segment of a pipeline; forwarding one or more sensor data packets from each remaining sensor node of the first cluster to the first head sensor node; forwarding the one or more sensor data packets from the first head sensor node to a second head sensor node of a second cluster of sensor nodes positioned along a second segment of the pipeline in a direction of a controlling base station; electing a replacement first head sensor node from the remaining sensor nodes of the first cluster when an energy level of the first head sensor node reaches a predetermined level; and forwarding an energy status of the first head sensor node to the replacement first head sensor node.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 28 is a flowchart for a method of sensor node data transfer according to one embodiment.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

As used herein, scalability refers to the need for load balancing, efficient resource usage, and reliable data aggregation.

Figure 1A:
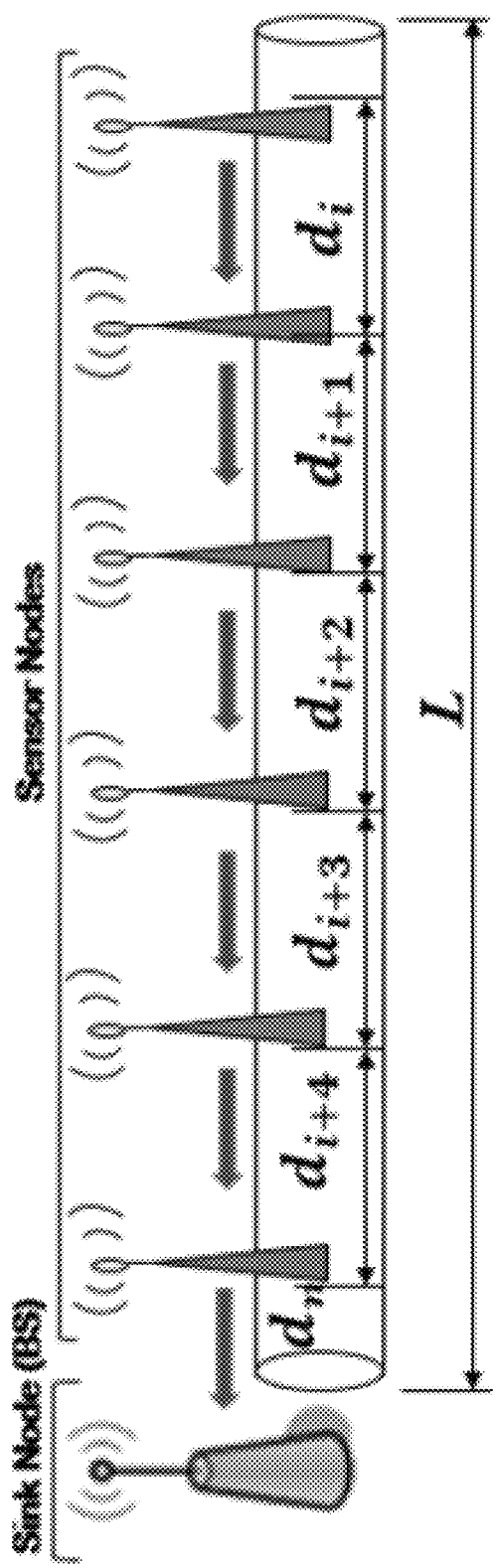
FIG. 1A illustrates a wireless sensor network (WSN) architecture of multiple sensor nodes (SNs) placed on pipelines according to one embodiment.

FIG. 1A illustrates a Wireless Sensor Network (WSN) architecture of multiple sensor nodes (SNs) placed on pipelines, which are directed to a base station (BS). The SNs are deployed along the pipelines in preselected sites. The SNs are in charge of data acquisition and report periodically to the BS. All SNs play an important role for forwarding the data between the reported SN and the BS using a multi-hop forwarding scheme. The data to be forwarded to the BS is carried by the SNs located between the sending SN and the BS, via multi-hop routes. This tends to waste the energy of the SNs placed nearest to the BS due to highly asymmetric loads on those SNs. After processing the received data, the BS determines whether a problem has already occurred or not.

Figure 1B:
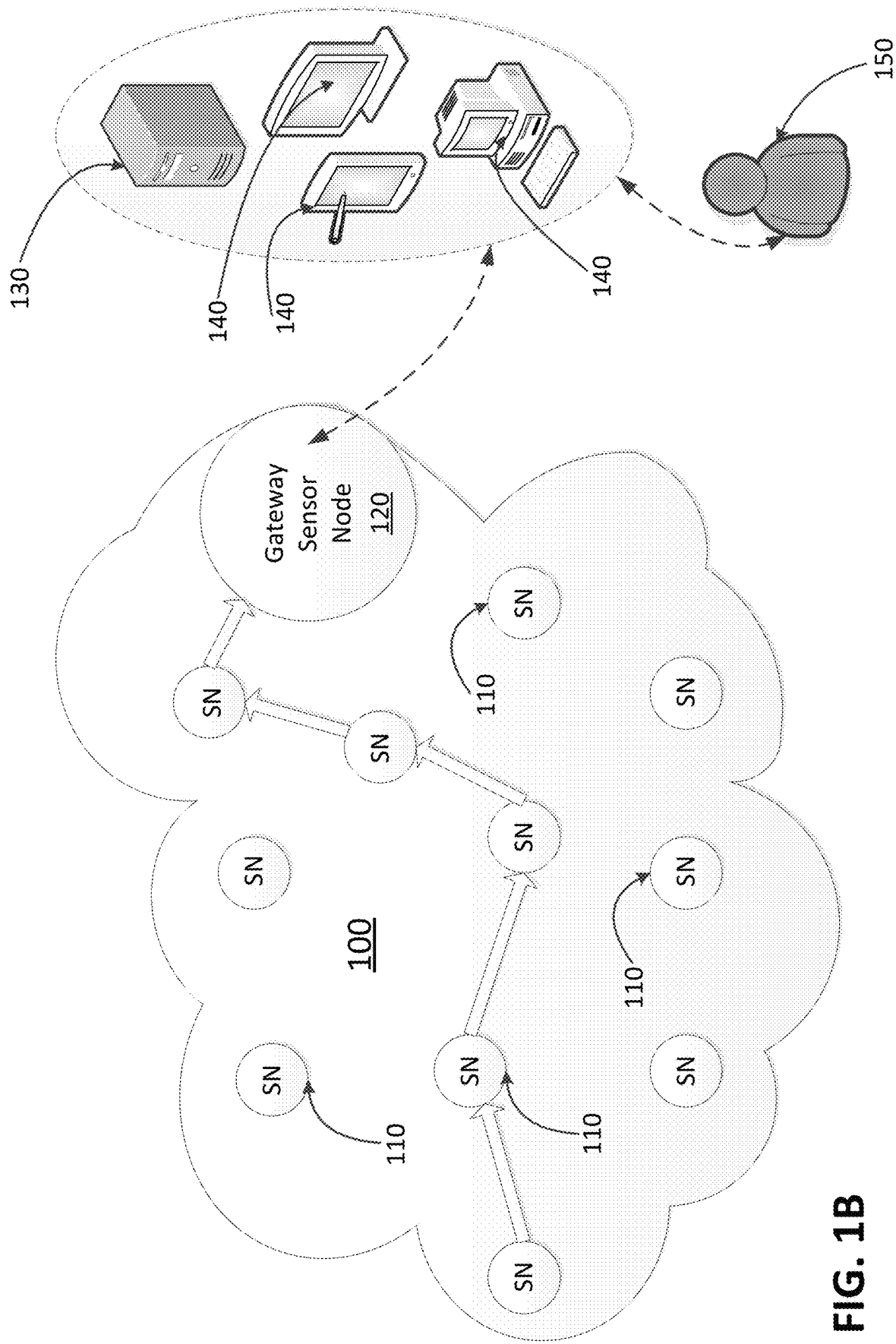
FIG. 1B illustrates an exemplary WSN architecture according to one embodiment.

FIG. 1B illustrates an exemplary WSN architecture 100 as used with embodiments described herein. WSN architecture 100 includes a plurality of spatially distributed autonomous sensor nodes 110, each configured to monitor physical and/or environmental conditions, such as temperature, sound, and pressure and to cooperatively pass their data to an associated sensor node 110 and subsequently through the WSN architecture 100 to a main location, such as a gateway sensor node 120. A WSN architecture 100 can be bi-directional, which enables it to control sensor activity, as well as receive data from the sensor nodes 110.

Each sensor node 110 includes structural features for retrieving sensor data and passing the data to an adjacent sensor node 110, and eventually to the gateway sensor node 120. Structural node features include a radio transceiver with an internal antenna or connection to an external antenna, a microcontroller, and an electronic circuit for interfacing with other sensor nodes 110 and to an energy source. The energy source can be a battery and/or an embedded form of energy harvesting. A sensor node 110 can vary in size depending upon purpose, cost, and energy requirements.

FIG. 1B also illustrates one or more servers 130 in which the WSN architecture 100 is controlled, and various client devices 140 in which a user 150 has access to the WSN architecture 100. Connections between the user 150 and the client devices 140 and/or the server 130 can be wired connections and/or wireless connections. Likewise, the connection between the gateway sensor node 120 and the client devices 140 and/or the server 130 can be wired connections and/or wireless connections.

The topology of WSN architecture 100 can vary from a simple star network to an advanced multi-hop wireless mesh network. FIG. 1B illustrates just a few sensor nodes 110 for simplicity. However, embodiments described herein are not limited to a particular size, topology, or function of the WSN architecture 100.

Figure 2:
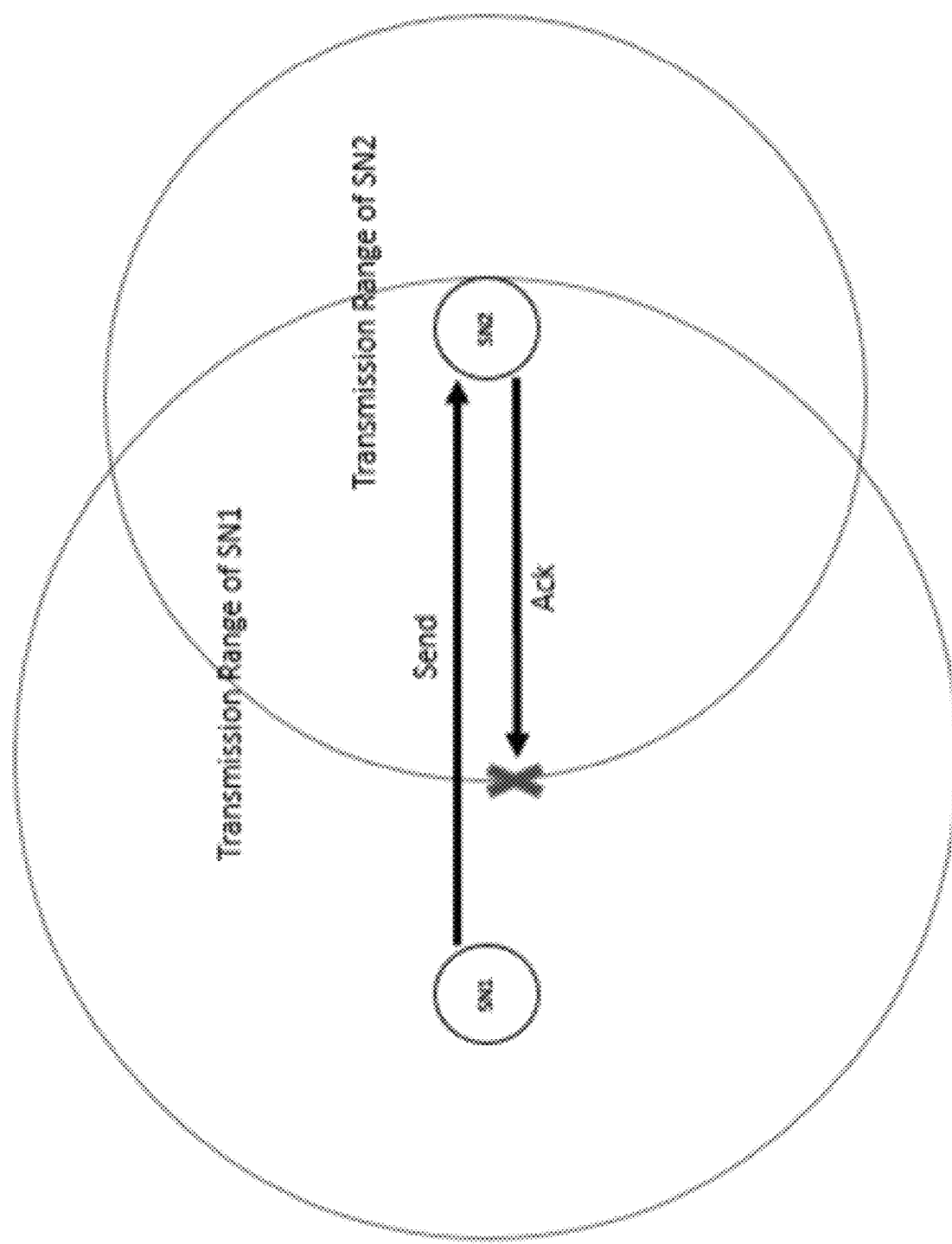
FIG. 2 illustrates limitations of a greedy heuristic approach and how the receiving SN cannot acknowledge the transmitting SN according to one embodiment.

Certain system model assumptions can be made for a WSN.
1. Each SN is responsible for performing a periodic inspection based on its sensing range.
2. All SNs are homogeneous, i.e., have the same power model, communication capabilities, energy supply, etc.
3. Each SN delivers its packet to its adjacent neighbor towards the BS.
4. The distances between adjacent SNs are equal, due to the need for a reliable communication. FIG. 2 illustrates limitations of a greedy heuristic approach and how the receiving SN cannot acknowledge the transmitting SN.
5. The BS receives the data from all SNs and performs the required actions.

In FIG. 1A, L denotes the length of a pipeline cluster. The monitoring sink node unit (i.e. BS) aggregates and summarizes the data. Let n denote the SNs along the pipeline cluster and let i denote a specific SN where $1 \le i \le n$. Let m denote the number of power levels (e.g. m=31 for TelosB, MicaZ) and each SN has a transmission power $P_j$ with a communication range $R_j$ where j=1, 2, 3, . . . , m. For example, to transmit the data at power level j, the required transmission power is $P_j$. Any SN can be set to a different power level and therefore, any SN can communicate within different transmission ranges.

An objective of embodiments described herein is to determine SNs that will serve as cluster heads, such that they reduce the total power consumption within the entire WSN. Each SN is assigned to only one cluster $c_r$, where $1 \le r \le NCH$, where NCH is the number of clusters (NCH$\le$n). Each SN can completely communicate with its cluster head, via a single or multiple hops. The objective is to balance the energy consumed by all SNs as much as possible.

To avoid shortcomings of greedy heuristic approaches, the length of the pipeline is divided into equal small segments and each segment should not exceed the maximum transmission range (e.g. 95 m if TelosB mote is used).

Figure 3:
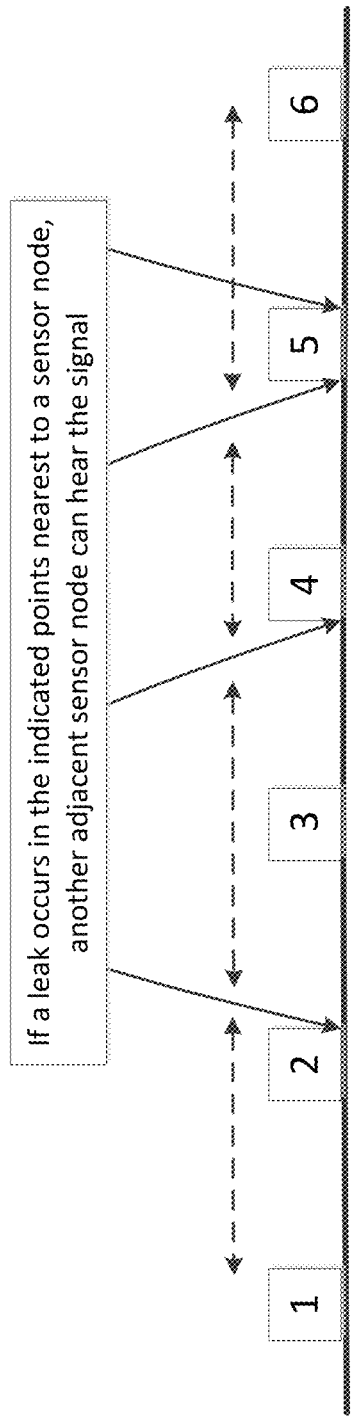
FIG. 3 illustrates a level of fidelity needed to capture leak signals by more than one SN according to one embodiment.

In one example, each segment represents a cluster and each cluster has three SNs. The distance between adjacent SNs is less than or equal to 32 m to acquire the necessary fidelity. The signal is acoustic and it is necessary to place more than one SN to detect the leak signals in order to obtain the required fidelity. Any leak signals should be heard by more than one SN because if the failure in detecting the problem occurs in one side, another SN can detect and report to the BS. FIG. 3 illustrates a level of fidelity needed to capture leak signals by more than one SN.

$$d_{fid} \le \frac{R_{max}}{n_{min}}$$

where $d_{fid}$ is the optimal distance to assure the fidelity $R_{max}$ is the maximum transmission range and $n_{min}$ is the minimum number of SNs to achieve this fidelity.

In the given example, all clusters have the same number of SNs and the cluster head is responsible for sending the loads from its members to the next cluster head to reach the BS. In each cluster, the SNs other than the cluster head transmit and forward the packets only among the same cluster leading to reduced energy consumption. A small pipeline section of 950 m and 30 SNs are given to illustrate the effect of clustering in power consumption. This example is given without using dynamic clustering.

Figure 4:
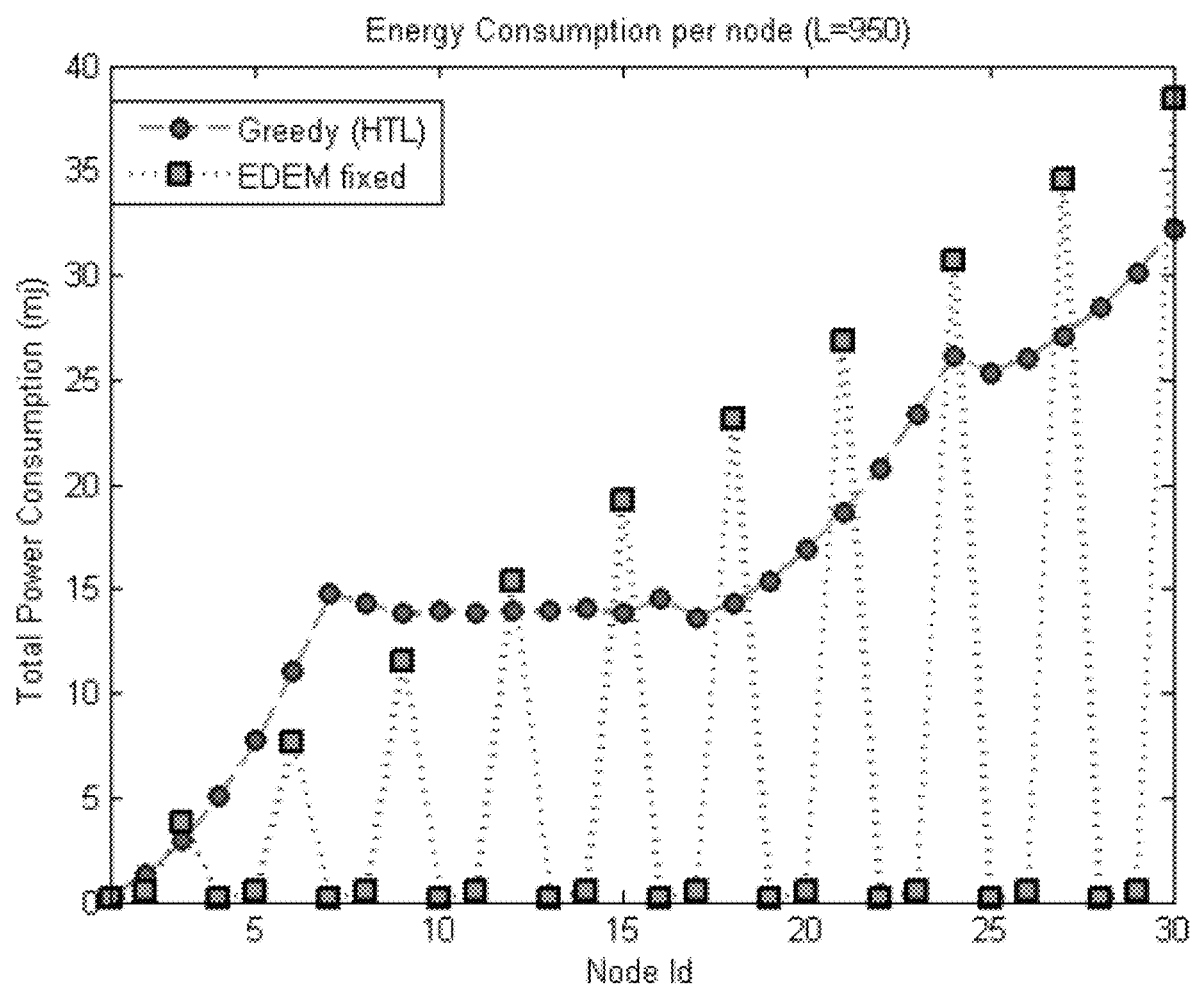
FIG. 4 is a graph illustrating a greedy (HTL) approach and an Equal Distance Equal Members (EDEM) fixed approach according to one embodiment.

FIG. 4 is a graph illustrating a greedy (HTL) approach and an Equal Distance Equal Members (EDEM) fixed approach when the pipeline length is 950 m and the number of sensor nodes is 30. In the greedy (HTL) approach, the last SNs in each cluster work as a cluster head all the time, which leads to more power consumed by the cluster head while the sensor nodes other than the cluster head still retain a large amount of energy. In contrast, for the EDEM fixed approach, the leader (i.e. cluster head) is elected periodically to balance the energy consumption among the same cluster so every SN serves as a cluster head.

Figure 5:
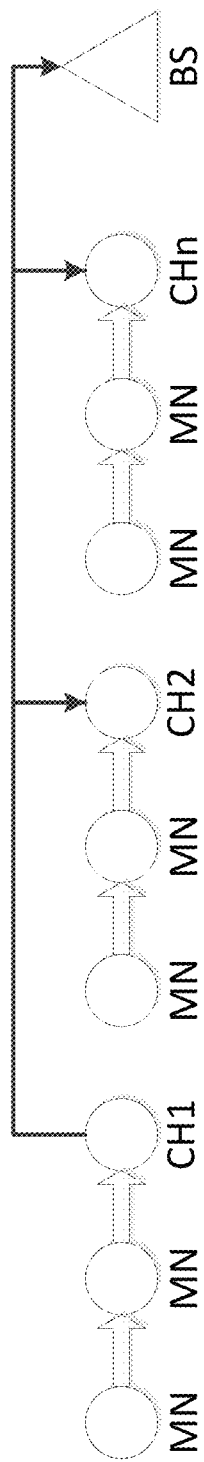
FIG. 5 illustrates a data forwarding process when the last SN in each cluster is the cluster head according to one embodiment.
Figure 6:
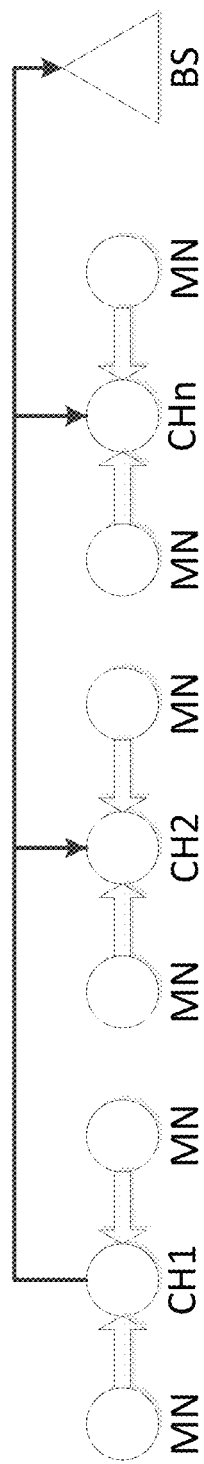
FIG. 6 illustrates a data forwarding process when the middle SN in each cluster is the cluster head according to one embodiment.
Figure 7:
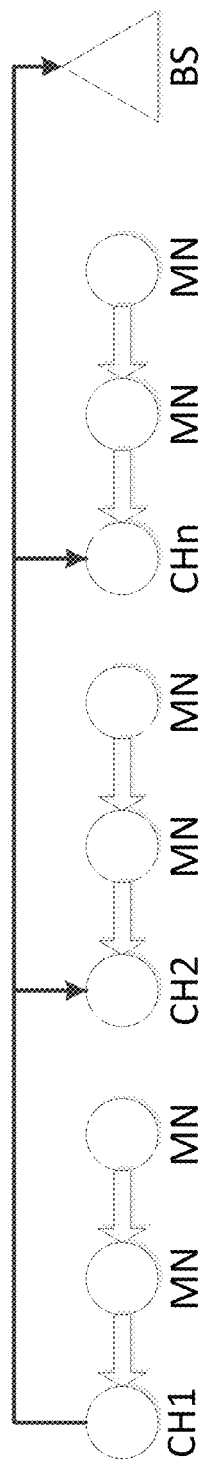
FIG. 7 illustrates a data forwarding process when the first SN in each cluster is the cluster head according to one embodiment.

FIG. 5 illustrates a data forwarding process when the last SN in each cluster is the cluster head. The cluster head sends the packet with maximum transmission power to deliver the data to the forwarding cluster head towards the BS. Similarly, FIG. 6 illustrates a data forwarding process when the middle SN in each cluster is the cluster head. Similarly, FIG. 7 illustrates a data forwarding process when the first SN in each cluster is the cluster head.

The next two algorithms describe the mechanism of this approach. It is assumed that all sensor nodes are synchronized.

TABLE 1

EDEM Algorithm

| | |
|---|---|
| 1 | Input: n, L, and ($P_j$, $R_j$) with j = 1 ... m; // m = 31 |
| 2 | If (n, $R_m$ < L) then |
| 3 | Exit: the input parameters are inadequate to cover the pipeline length |
| 4 | End if |
| 5 | Calculate number of clusters, NC = L/$R_m$ // the number of clusters |
| 6 | If (NC = n) |
| 7 | Exit: all nodes are transmitting at maximum power and clustering is not possible |
| 8 | End if |
| 9 | NMs = round ($R_m$/$R_8$) // number of members |
| 10 | If (n < NMs * NC) to obtain required accuracy (range of PL8 is 32) |
| 11 | Exit: NMs does not achieve the required fidelity |
| 12 | End if |
| 13 | Start communicating based on a dynamic EDEM Algorithm |

Table 1 is an algorithm illustrating the EDEM approach. In steps 2-4, if the number of sensors n is not enough to cover the intended pipeline length L, the algorithm will fail and it will exit. Otherwise, the SNs are grouped into clusters based on the maximum transmission range $R_m$ in step 5. Therefore, the length of each cluster is equal to $R_m$ (e.g. $R_m$=95 in a CC2420 power model). In addition, each cluster selects one SN to be a cluster head in charge of forwarding the internal and incoming packets. The cluster head transmits at its maximum transmission power.

To start the clustering, the number of SNs should be adequate (line 6-8). In order to select the member SNs, they should be selected to obtain an optimal number of members that achieve the minimum required fidelity (steps 9-12). Line 13 starts the dynamic EDEM algorithm, as illustrated in Table 2 herein.

Figure 8:
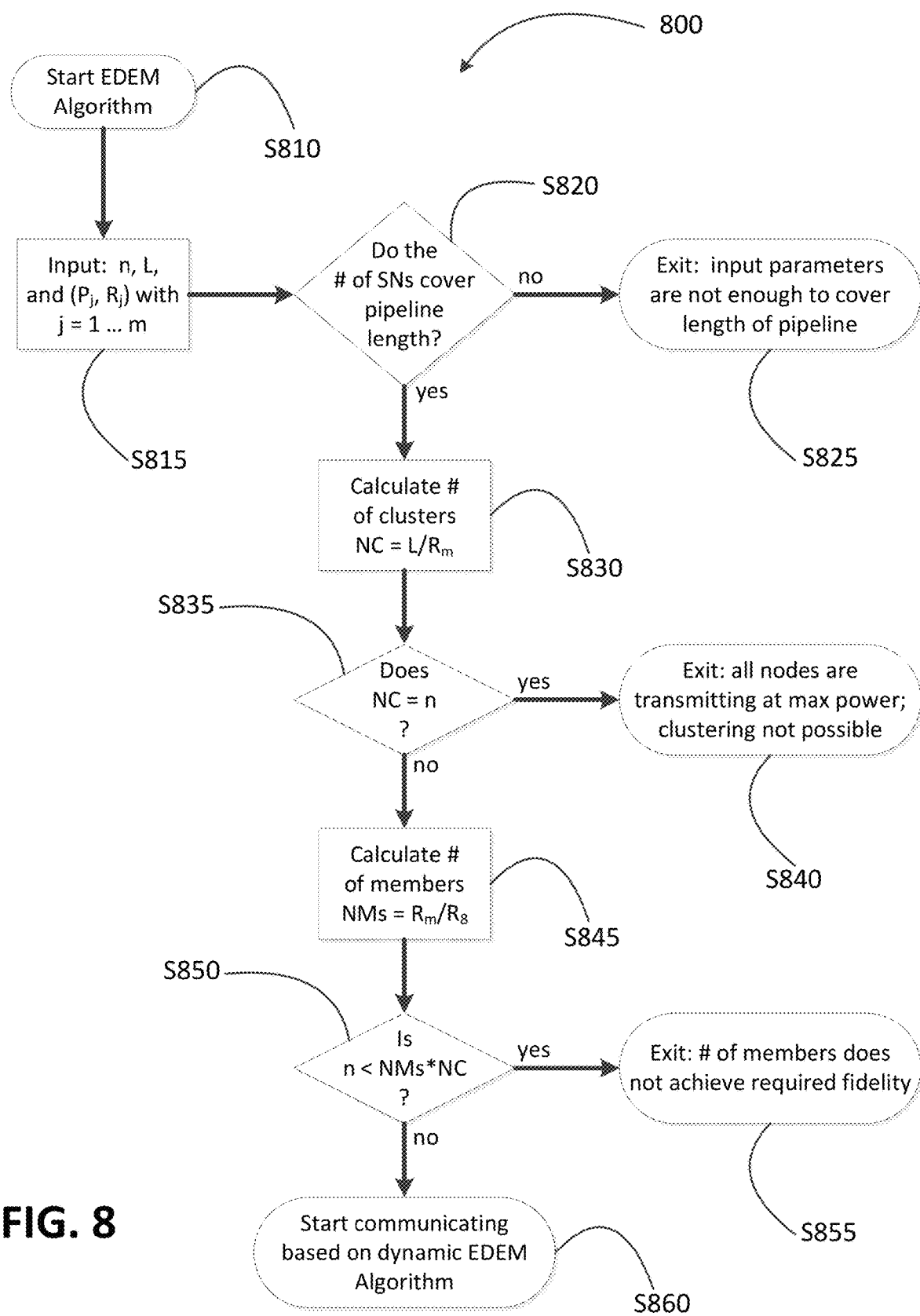
FIG. 8 is a flow chart illustrating the EDEM algorithm according to one embodiment.

FIG. 8 is a flowchart illustrating the EDEM algorithm 800 of Table 1. In step S810, the EDEM algorithm starts.

In step S815, variables for n, L, and $(P_j, R_j)$ with j=1 . . . m are input (line 1).

In step S820, it is determined whether the number of SNs covers the length of the pipeline. If the number of SNs does not cover the length of the pipeline (a "NO" decision at step S820), the process ends at step S825. Input parameters are not enough to cover the length of the pipeline (lines 2-3). If the number of SNs does cover the length of the pipeline (a "YES" decision at step S820), the process proceeds to step S830.

In step S830, the number of clusters is calculated as NC=L/$R_m$ (line 5).

In step S835, it is determined whether NC=n. If NC is equal to n (a "YES" decision at step S835), the process ends at step S840. All nodes are transmitting at maximum power and therefore, clustering is not possible. If NC is not equal to n (a "NO" decision at step S835), the process proceeds to step S845.

At step S845, the number of members (NMs) is calculated, wherein NMs=$R_m$/$R_8$.

At step S850, it is determined whether n<NMs*NC. If n is less than NMs*NC (a "YES" decision at step S850), the process ends at step S855. The number of members does not achieve a required or established fidelity. If n is not less than NMs*NC (a "NO" decision at step S850), the process proceeds to step S860.

At step S860, communication begins based on a dynamic EDEM Algorithm. The dynamic EDEM Algorithm is illustrated in Table 2 herein.

In Table 2, the last SN in each cluster is selected as a cluster head (step 1). The other SNs are set to a transmission power of level 8. In steps 3 to 16, the clustering process of the dynamic EDEM is based on the energy budget (steps 11 to 12), which should be periodically checked to know the time for changing the cluster heads (steps 13 and 14).

The total power consumption of each cluster is computed by calculating the inner power consumption consumed by cluster members and the power consumption consumed by the cluster head itself. It can be modeled as $$P_{total}=\text{intra-power consumption}+\text{inter-cluster head power consumption}.$$

Figure 9:
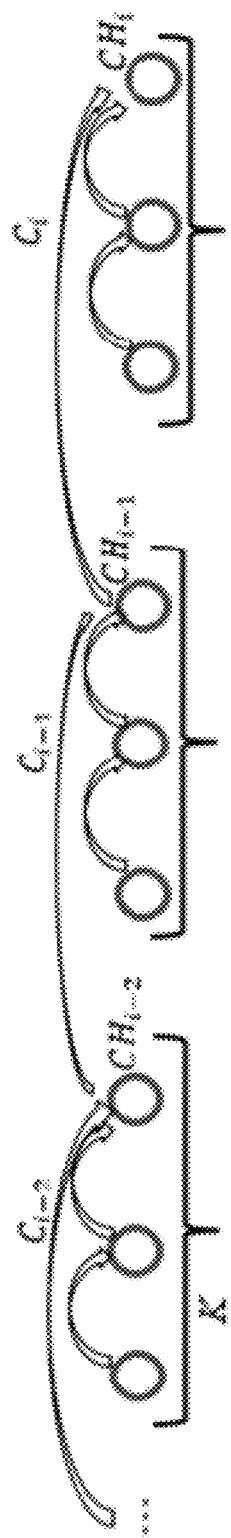
FIG. 9 illustrates the intra-power consumption and the inter-cluster head power consumption model according to one embodiment.

The intra-power consumption is the energy consumed by the SNs inside the same cluster, while the inter-cluster head power consumption is the energy consumed by the cluster head of the cluster. FIG. 9 illustrates the intra-power consumption and the inter-cluster head power consumption model when the cluster head (CH) sends signal packets from its cluster, C and from other clusters.

The intra-power consumption $EC_i$ can be calculated as $$EC_i = \sum_{j=1}^{k-1} j \cdot P_T \cdot t + (j-1) \cdot P_R \cdot t \quad (1.1)$$

where $EC_i$ is the energy consumption of SNs in cluster i and k is the number of the SNs in each cluster, which is evenly adopted in this approach. Also, $P_T$ is the required transmission power for one signal packet, $P_R$ is the required receiving power for one signal packet, and t is the required time for transmitting or receiving a signal packet.

The inter-cluster head power consumption of the cluster head CH, can be calculated as $$ECH_i=(i \cdot k) \cdot P_C \cdot t+(i \cdot k-1) \cdot P_R \cdot t \quad (1.2)$$

From Equation 1.2, the total power consumption of each cluster can be modeled as $$P_{total_i}=EC_i+ECH_i \quad (1.3)$$

Based on Equation 1.3, the lifetime of each cluster can be calculated as

TABLE 2

EDEM Mechanism Algorithm

1  Start: assign last SN in each cluster as a cluster head (CH) and start announcing
2  Set i = 1
3  For all SNs along the pipeline: $SN_i$ ≤ n
4  Compute the $Threshold_{index}$ = $\alpha E_{budget}$ where a is a predefined constant or variable that determines how much of the energy budget to be utilized while a node is serving as a cluster head node.
5  If $SN_i$ is CH
6  Set the transmission power to $P^{max}$
7  End if
8  If $SN_i$ is normal node // Normal sensor node
9  Set the transmission power to $P^8$
10 End if
11 Check the energy status of all CHs
12 If ($E_{budget}$ ≤ $Threshold_{index}$)
13 Send advertisement "I am NOT a CH"
14 In all clusters: select other SN to be a CH
15 End if
16 End for $$LT_{c_i} = \frac{k.E_{budget}}{P_{total_i}} \qquad (1.4)$$

Simulation experiments were conducted to examine the effectiveness of the EDEM technique. MATLAB was used to simulate the EDEM technique with different pipeline lengths of 950 meters to 9500 meters. Experimental parameters are outlined in Table 3.

TABLE 3

Experimental Parameters

| Parameter | Value |
| --- | --- |
| Simulation tool | MATLAB |
| Pipeline lengths (meters) | 950, 1900, 3800, 4750, 9500 |
| Number of sensor nodes | 30, 60, 120, 150, 300 |
| Battery capacity | 2600 mAh |
| Battery voltage | 3 V |
| Time, t to transmit/ receive one packet | 1 second |
| Receiving power, $R_x$ | 0.0564 Watts |
| Transmission power, $P_T$ (member node) | 0.0297 Watts |
| Transmission power, $P_C$ (cluster head) | 0.0510 Watts |

The following performance metrics were used.
1. The total power consumption measures the total energy of each SN and for EDEM clustering technique as in Equations 1.1 and 1.2. This metric shows the effectiveness of the EDEM clustering technique in terms of the energy conserved.
2. The network lifetime measures the estimated lifetime of each SN based on the lifetime equation for the greedy HTL technique and based on equations 1.4 for the EDEM clustering technique. This metric also determines the lifetime of the entire network and shows the ability of the EDEM clustering technique to expand the network lifetime.
3. The total number of packets counts the number of packets that are forwarded in each round throughout the network. This metric illustrates the ability of the EDEM clustering technique to forward the signal packets.

The performance metrics can be used to determine the node placement approach to be used and why.

The EDEM clustering technique was compared to the greedy HTL approach used in previous studies. In a greedy HTL approach, the density of the deployed SNs increases as the distance gets closer to the BS. Also, the SNs most distant from the BS transmit at a maximum transmission power, and the SNs closest to the BS transmit at a minimum transmission power.

The performance evaluation of the node placement approach was considered under different scenarios. In a first approach for sensor node distribution, the SNs in a greedy HTL approach were deployed based on the output vector V, as used in greedy HTL algorithms. In the EDEM clustering approach, a power level of 31 for all cluster heads was used, and a distance between all adjacent SNs of 32 m with a transmission range power level of 8 was used. For both approaches, the same number of SNs was used, but the distances between SNs was based on the transmission ranges of the assigned power levels.

Figure 10:
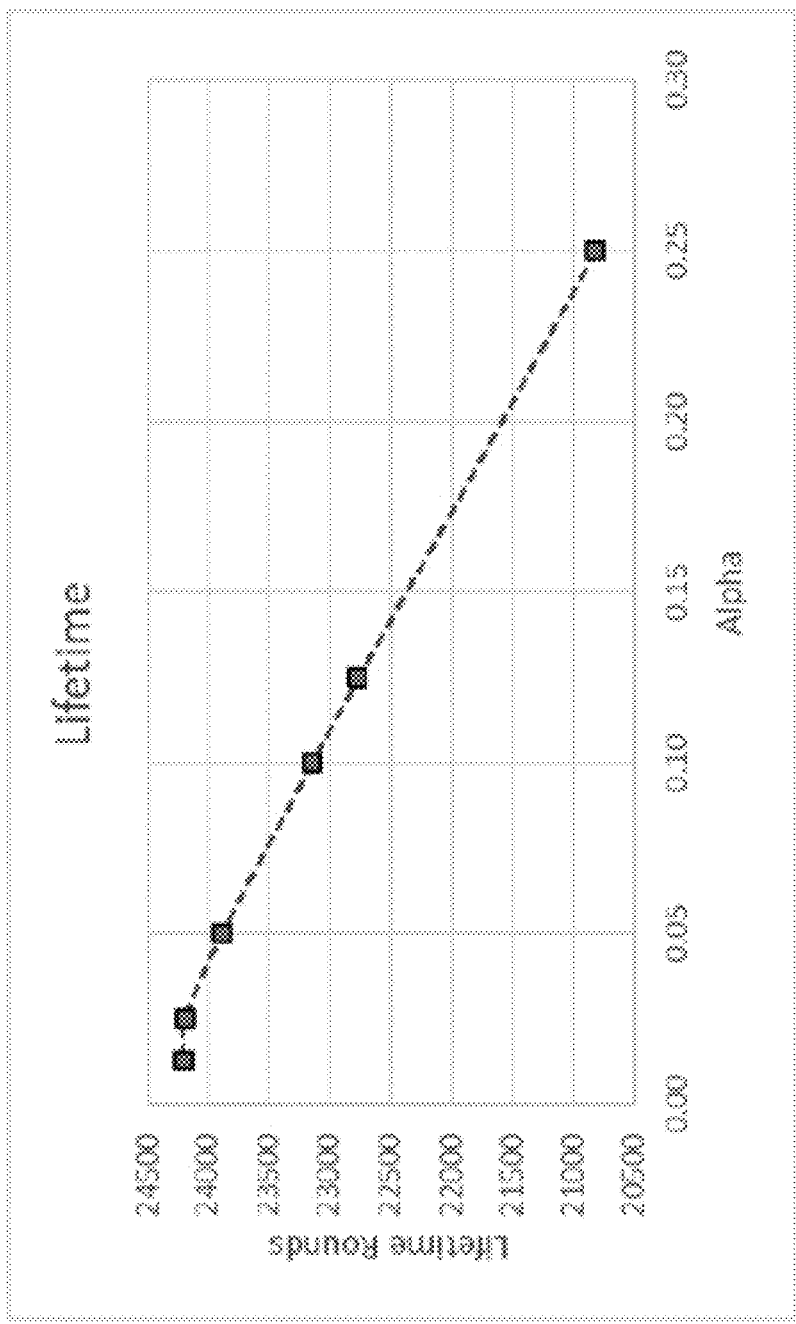
FIG. 10 is a graph illustrating the network lifetime of SN batteries according to one embodiment.

For the EDEM clustering approach, the cluster heads were changed periodically, based on the $\alpha$ value. FIG. 10 is a graph illustrating the network lifetime of SN batteries for a number of lifetime transmission cycles based on the associated $\alpha$ value when the pipeline length is 950 m and the number of sensors is 30. The testing parameters were 950 m for $\alpha$ from 0.01 to 0.25. As illustrated in FIG. 10, the lifetime increased as the $\alpha$ value decreased. Therefore, the minimum $\alpha$ value was adopted for all testing scenarios.

Figure 11:
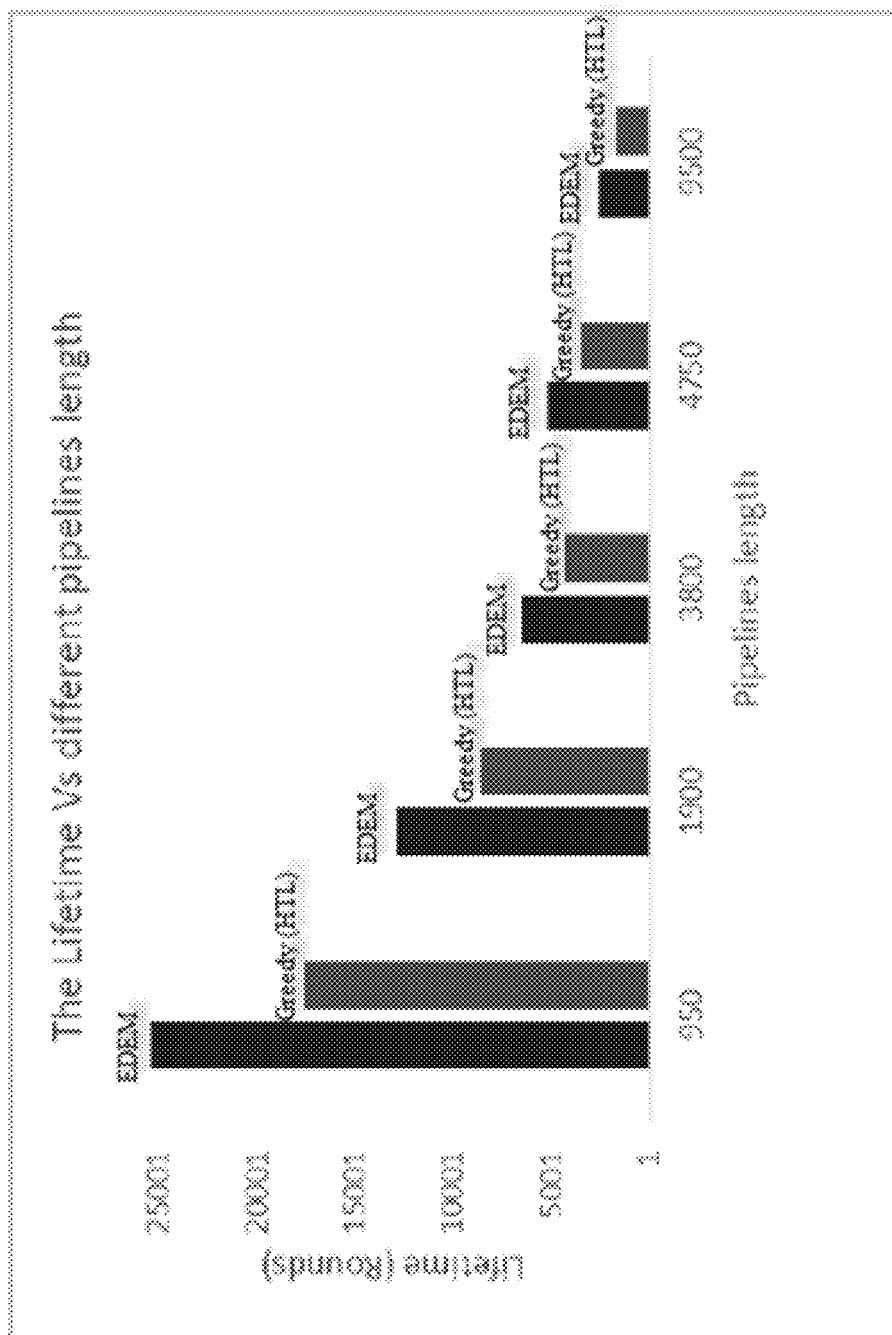
FIG. 11 is a bar graph illustrating the lifetime of the network using the greedy HTL approach and the EDEM clustering approach according to one embodiment.

FIG. 11 is a bar graph illustrating the lifetime of the network using the greedy HTL approach and the EDEM clustering approach when the pipeline length is 950, 1900, 3800, 4750, and 9500 m. It can be observed that in all scenarios, the lifetime of the EDEM clustering approach outperforms the greedy HTL approach. In the EDEM clustering approach, the loads decrease along the network and only specific SNs cooperatively carry out the signal packets towards the BS. The increasing ratio ranges from 56% when the length of the pipeline is 950 m up to 62% when the length of the pipeline is 9500 m. In both approaches, increasing the length of pipelines significantly shortened the network lifetime.

Figure 12:
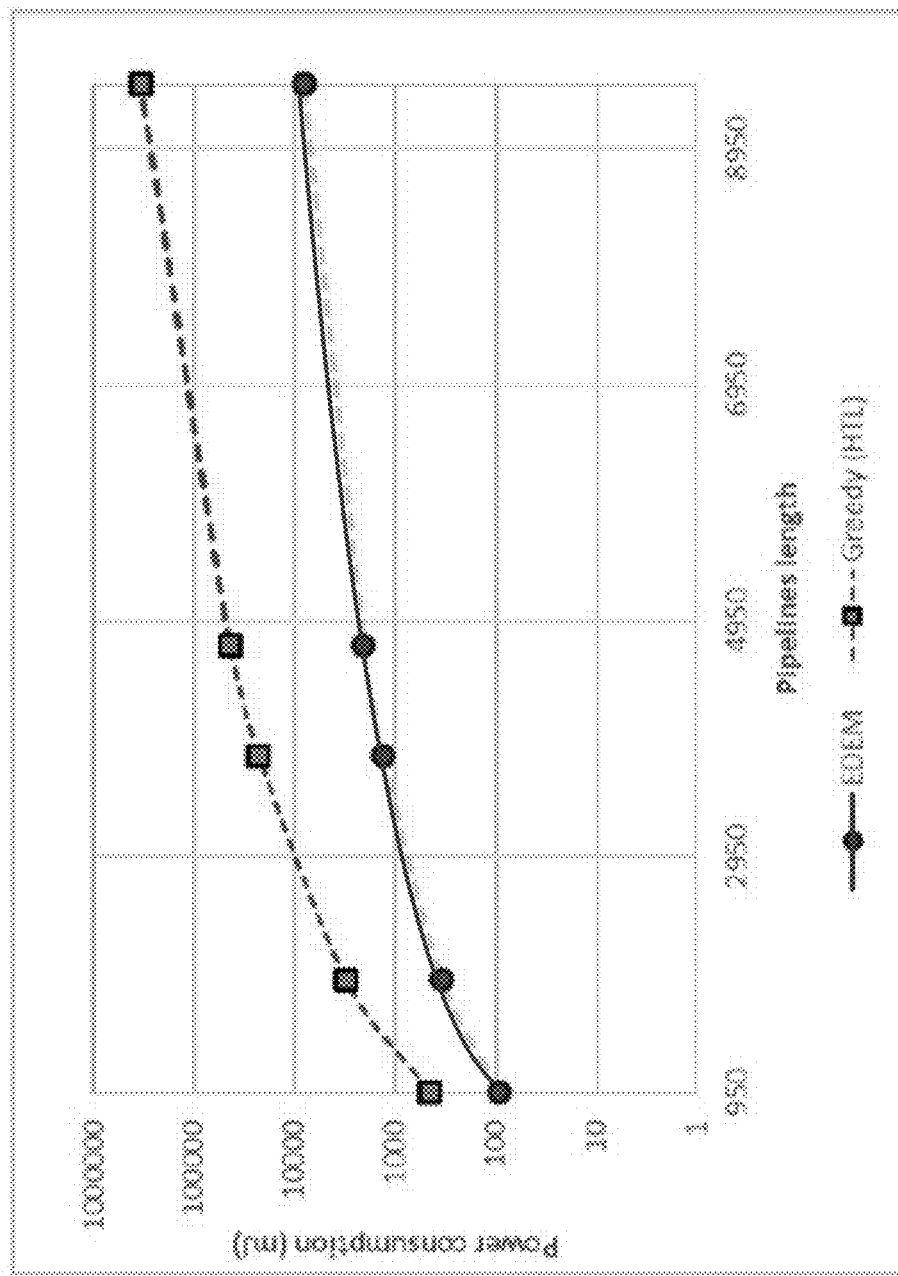
FIG. 12 is a graph illustrating the power consumption in all tested scenarios according to one embodiment.

FIG. 12 is a graph illustrating the power consumption in all tested scenarios when the pipeline length is 950, 1900, 3800, 4750, and 9500 m. The EDEM clustering approach conserves the energy along the entire pipeline length because the loads are shared among all cluster SNs and the power consumption is balanced. In contrast, for the greedy HTL approach, the last SN is in charge all the time to deliver all forwarded signal packets to the BS. The amount of energy savings can reach up to 300% when L=950 m and up to more than 500% when the pipeline is 9500 m. This big difference is a result of reducing the number of forwarded signal packets, which in turn significantly reduce the required transmission and reception power.

Figure 13:
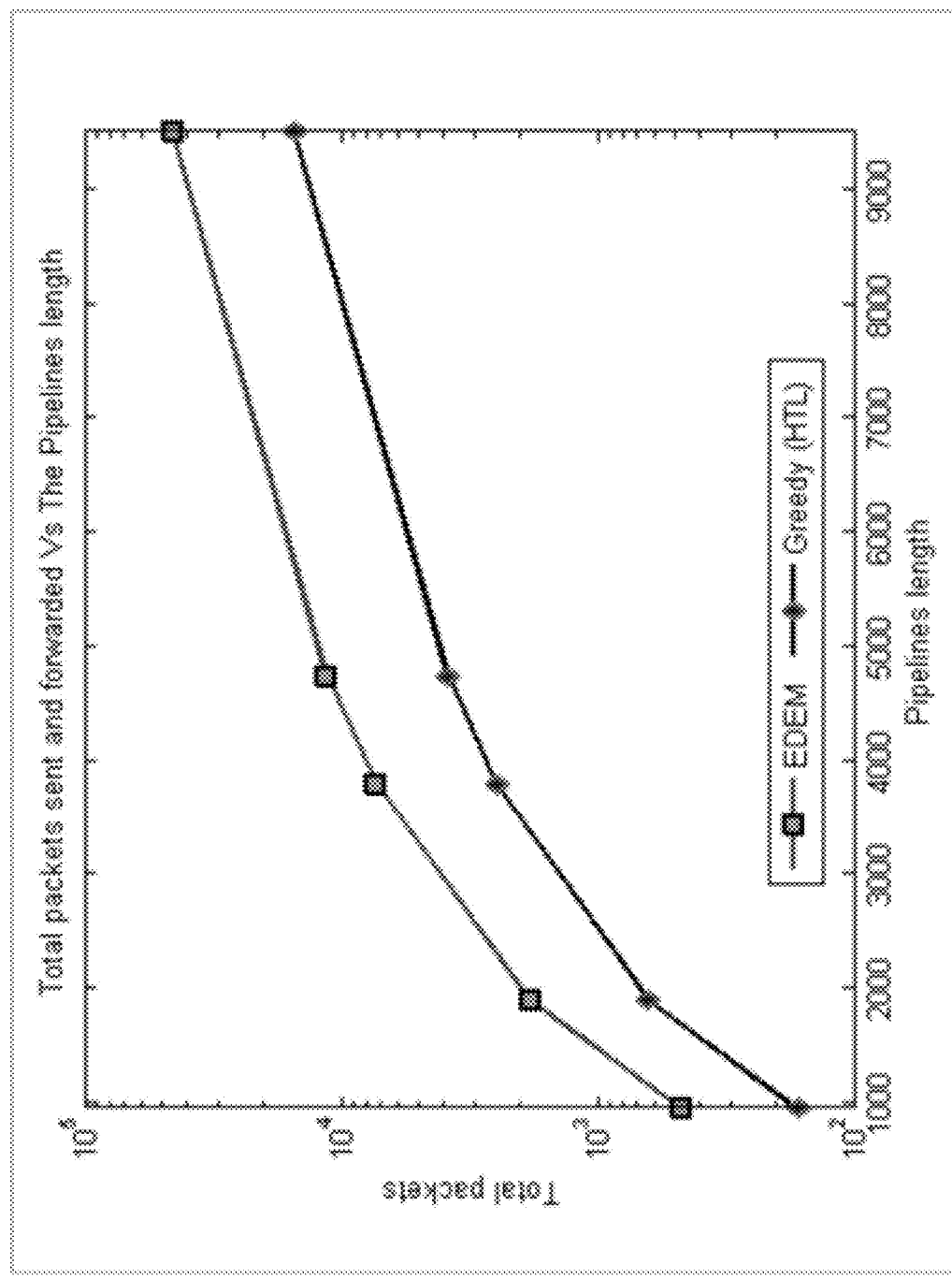
FIG. 13 is a graph illustrating the total number of packets transmitted and forwarded according to one embodiment.

FIG. 13 is a graph illustrating the total number of packets transmitted and forwarded when the pipeline length is 950, 1900, 3800, 4750, and 9500 m. The number of total packets sent and forwarded in the EDEM clustering approach dramatically decreased because the number of hops ensued by the packets decreased significantly. For greedy HTL approaches, the number of hops of the packet sent by SN, is n−i while in EDEM approach, the number of hops is equal to the number of clusters, NC.

$$Num \text{ of hops node}(i, j) = \begin{cases} NC - j & \text{if the sender is } CH \\ (NC - j) + (k - i) & \text{if the sender is a normal node.} \end{cases}$$

where j is the cluster id and k is the number of member SNs.

Simulation results were validated, in which the two approaches were implemented with hardware devices in an outdoor environment using a greedy HTL algorithm and the EDEM clustering algorithm.

An experiment for each approach was conducted using motes hardware. Each experiment was repeated five times to acquire more reliable results. The objective was to determine the impact of node placement approaches on the SN battery lifetime.

Experimental studies were implemented using TelosB motes. The TelosB motes have been supplied by AA batteries.

Experimental setup include the following parameters.
30 TelosB motes were deployed along 950 meters of pipeline length.

01 mote was connected to the gateway as a sink node to receive data from the other motes. It forwards the data to the PC.

Gateway uses a serial dump tool to get data from the sink node's serial port and a terminal client running to capture the data.

ContikiOS programs the motes.

The motes were deployed based on the greedy output vector V, which identifies the transmission power level of each mote, as illustrated in Table 4. The distances between the motes were adopted based on the transmission range of each power level.

TABLE 4

Power level assignment of greedy HTL approach experiment

| Power level | 31 | 24 | 20 | 15 | 11 | 8 | 5 | 4 | 3 | 2 | 1 |
|---|---|---|---|---|---|---|---|---|---|---|---|
| Number of motes | 6 | 1 | 1 | 1 | 1 | 1 | 1 | 2 | 7 | 5 | 4 |

In the EDEM approach experiment, the same components were used, but the deployment of the motes was achieved based on the EDEM algorithm. The distance between the adjacent SNs was equal to 32 m. The length of each cluster was 95 m.

Contiki's internal power profiling was used for power consumption. Contiki has a built-in power profiling module that measures the up-time of various components. For example, it can be used to estimate the radio duty cycle.

For every sensor node in the network, the energest module has been combined with the uploaded code to track the power consumption and append the readings to the messages sent to the BS. The energest module is used to track the power consumption, and the uploaded code is the code running on the sensor nodes. Specific readings, such as temperature, light, and/or voltage can be considered, which are retrieved by a sensor node, such as a TelosB mote.

The following steps of the EDEM clustering approach were used to estimate the energy consumption.

1. Each SN collects its readings and reports to the BS every two minutes.
2. The time of sending and forwarding all signal packets in one round is called a cycle.
3. For every reading of the Tx, Rx, LPM, and CPU, the energy consumption of each mode is computed based on its current consumption (e.g. the current of Tx at level 31 is 17.4 mA), where Tx is the Transmission Power, Rx is the Receiving Power, and LPM is the low power mode.
4. The total energy consumption of each cycle is calculated as follows.

$$Energest_{value} percycle = current\ Energest_{value} - previous\ Energest_{value}.\qquad(1.5)$$

where $Energest_{value}$ is the times the mote spends in the state $$P_{total} = P_{Tx} + P_{RX} + P_{LPM} + P_{CPU} \qquad(1.6)$$

5. To calculate the overall energy consumption, $P_{total}$ for all cycles is calculated.

Table 5 illustrates experimental parameters used in the EDEM clustering approach experiment.

TABLE 5

EDEM clustering approach experiment parameters

| Parameter | Value |
|---|---|
| ContikiOs Ver | 2.7 |
| Number of sensor nodes (SNs) | 30 |
| Pipeline length | 950 meters |
| Tx current consumption | 8.5-17.4 mA |
| Rx current consumption | 18.8 mA |
| CPU current consumption | 1.8 mA |
| LPM current consumption | 5.1 µA |
| Voltage | 3 V |
| Nominal capacity | 2600 mAh |

As illustrated in Table 5, TelosB mote was used with current in an active mode of 1.8 mA, and a sleep mode of 5.1 µA. The Tx varied from 8.5 to 17.4, based on an adopted power level of the Rx at 18.8 mA and the voltage at 3 V.

ContikiOs enables tracking the how much time each mote is in an active state. For example, ALL_Tx is the total (high) Tx time from the beginning of sensor operation, in the form of a number of ticks. In order to estimate the energy consumption in a duration of time, the power incurred during that time is calculated by subtracting the current of ALL_Tx from the previous ALL_Tx since the $Energest_{value}$ is incremented and is not reset to zero.

The performance of the two approaches was analyzed using different setups to explore the effect of using real sensor nodes in outdoor environments. In a first analysis, the effect on the sensor node lifetime and total energy consumption was analyzed for the greedy HTL algorithm.

Figure 14:
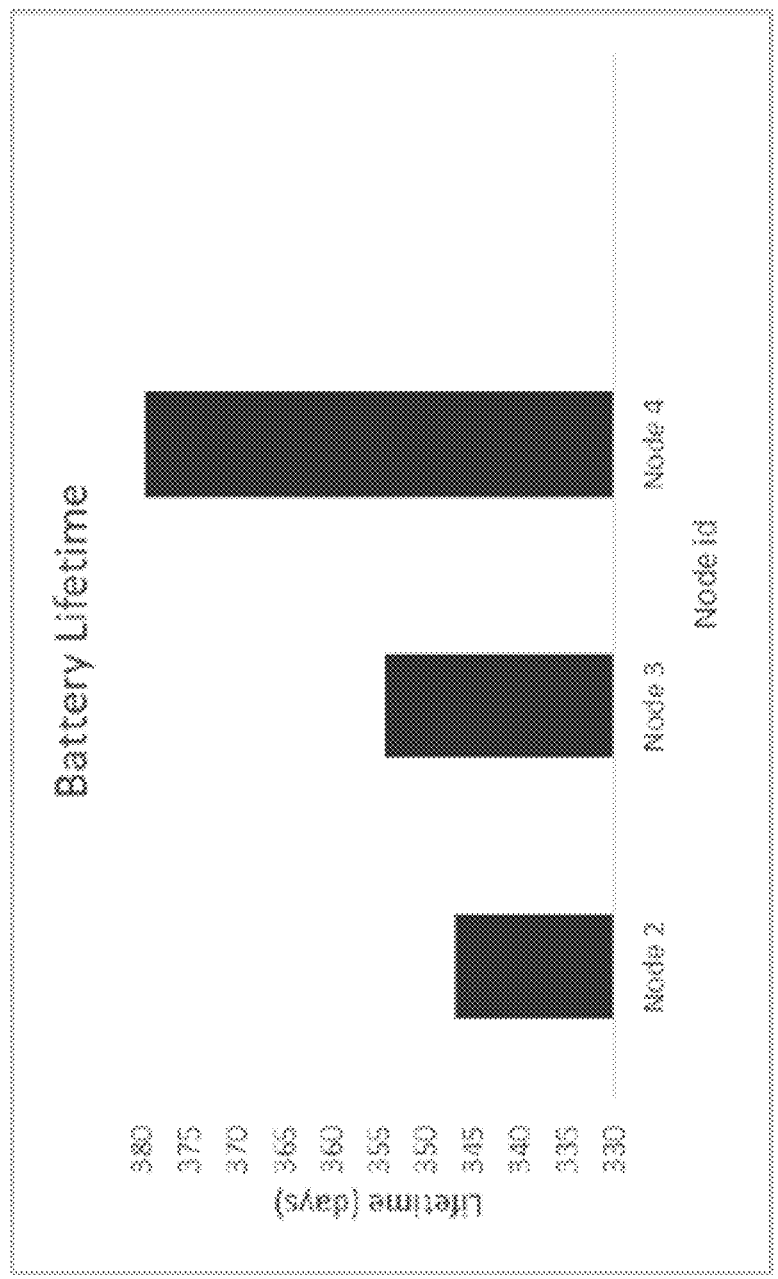
FIG. 14 is a bar graph illustrating the battery lifetime of the last three SNs and the BS under the greedy HTL approach according to one embodiment.

FIG. 14 is a bar graph illustrating the battery lifetime of the last three SNs and the BS under the greedy HTL approach when the pipeline length is 950 m and the number of deployed sensors is 30. The lifetime of the network is dictated by the lifetime of node 2, which is nearest to the BS. The node 2 responsibility is to forward all packets to the BS all the time, which leads to depletion of its energy quickly. FIG. 14 also illustrates the lifetime of nodes 3 and 4 at the same power level as node 2. As illustrated, the lifetime of the nodes decreases based on their distance from the BS.

Figure 15:
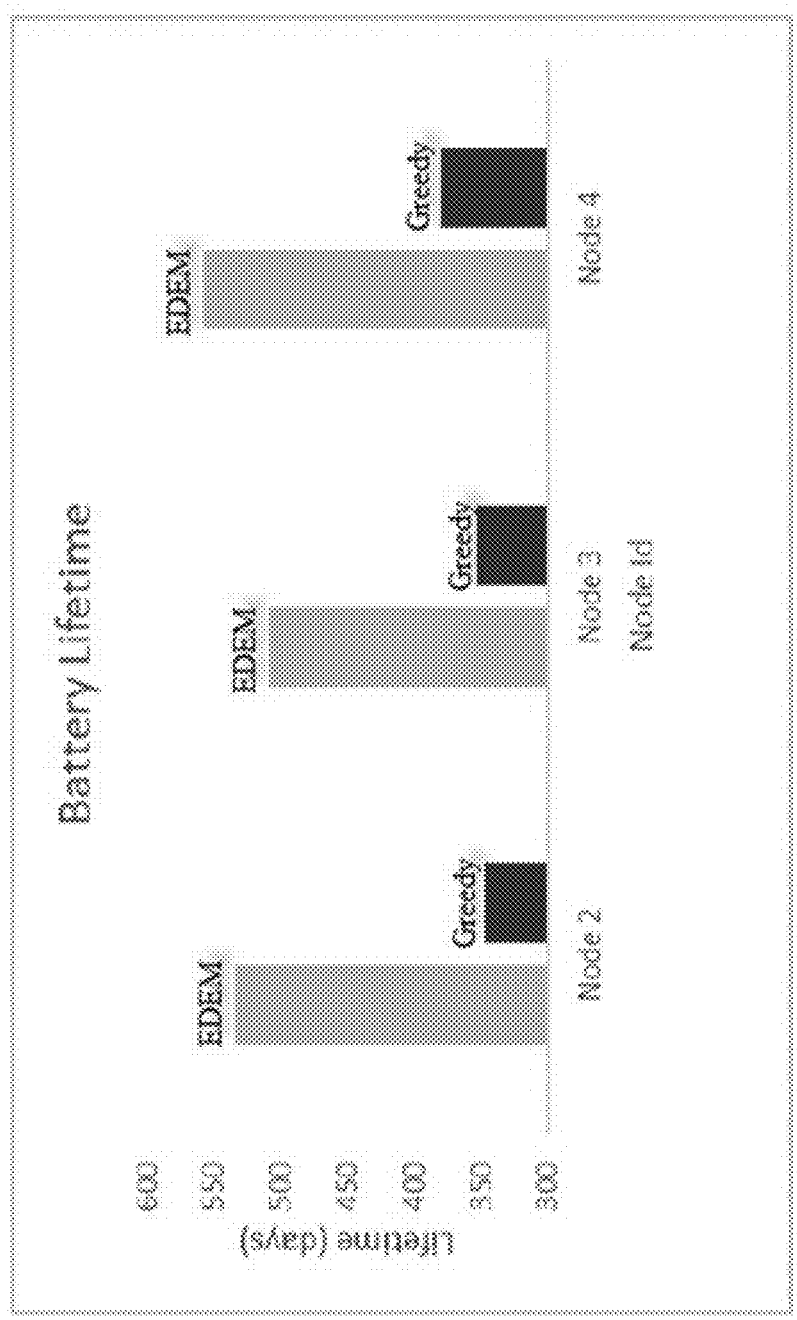
FIG. 15 is a bar graph illustrating the battery lifetime comparison between the greedy HTL approach and the EDEM clustering approach according to one embodiment.

FIG. 15 is a bar graph illustrating the battery lifetime comparison between the greedy HTL approach and the EDEM clustering approach when the pipeline length is 950 m and the number of deployed sensors is 30. It can be concluded from FIG. 15 that the EDEM clustering approach can increase the lifetime of a sensor node battery by 50%. This enhancement in the battery lifetime is a result of the dynamic clustering and sharing of the loads. Other sensor nodes simply pass the signal packets within the same cluster towards their respective cluster head.

Figure 16:
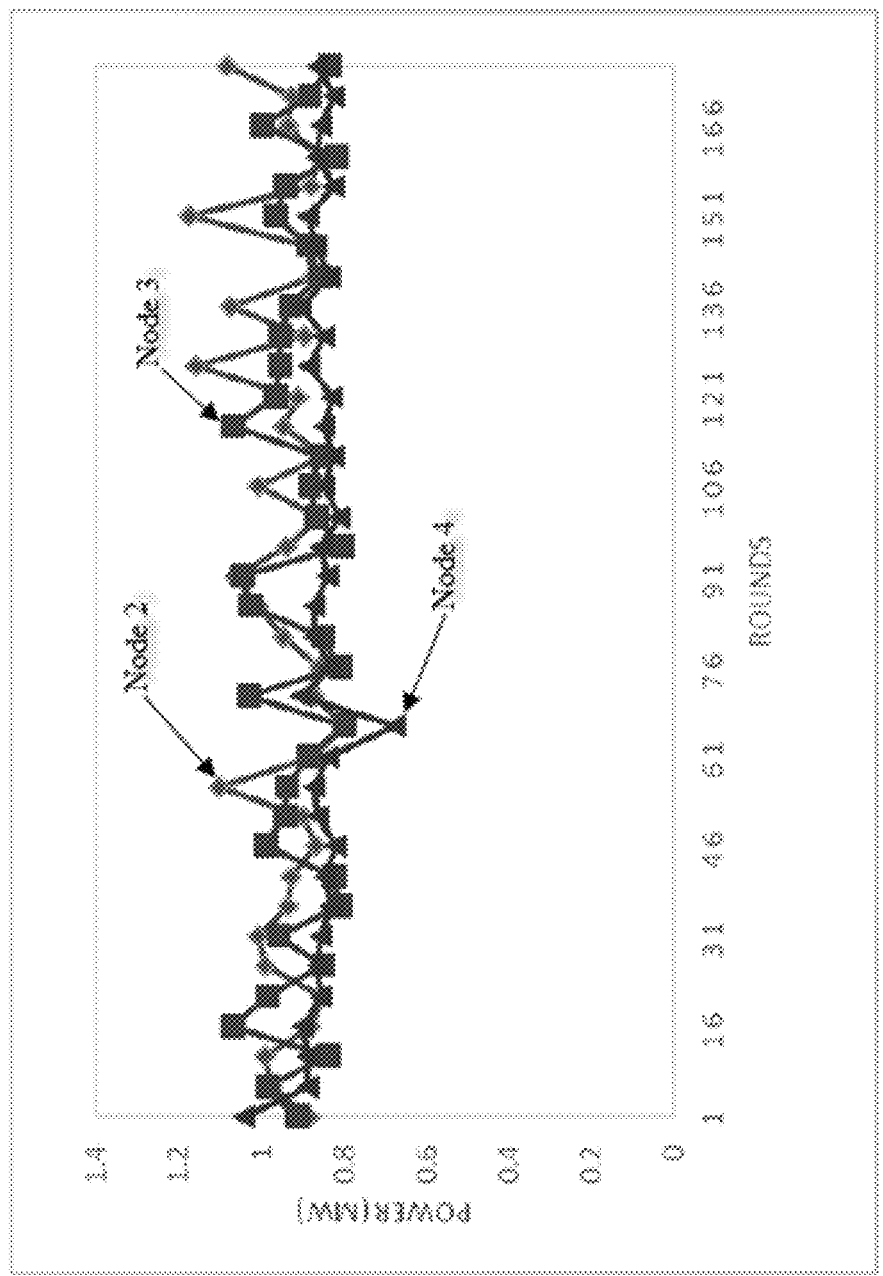
FIG. 16 is a graph illustrating the power consumption of the last three nodes for the greedy HTL approach according to one embodiment.

The power consumption analysis primarily focused on the power consumed for each transaction. FIG. 16 is a graph illustrating the power consumption of the last three nodes for the greedy HTL approach when the pipeline length is 950 m and the number of deployed sensor nodes is 30. The last node (node 2) consumes the highest power because it forwards all incoming packets for the entire network. The power consumption is gradually decreased as the sensor nodes become farther away from the BS.

Figure 17:
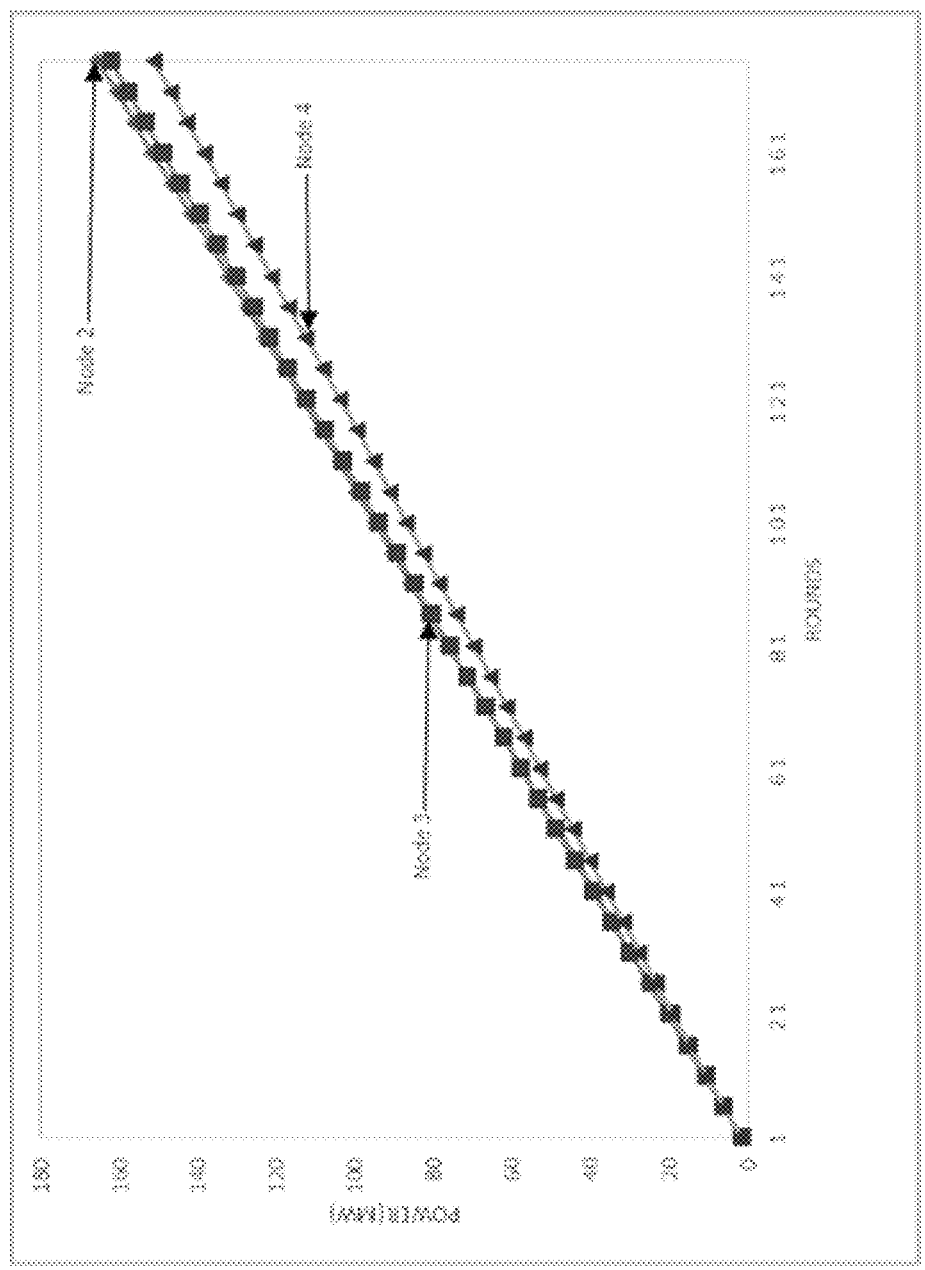
FIG. 17 is a graph illustrating the cumulative power consumption of the last three nodes using the greedy HTL approach according to one embodiment.

FIG. 17 is a graph illustrating the cumulative power consumption of the last three nodes using the greedy HTL approach when the pipeline length is 950 m and the number of deployed sensor nodes is 30. The power consumption increases steadily as the rounds increase. In this approach, each sensor node keeps consuming approximately the same power for all rounds during the operational time.

Figure 18:
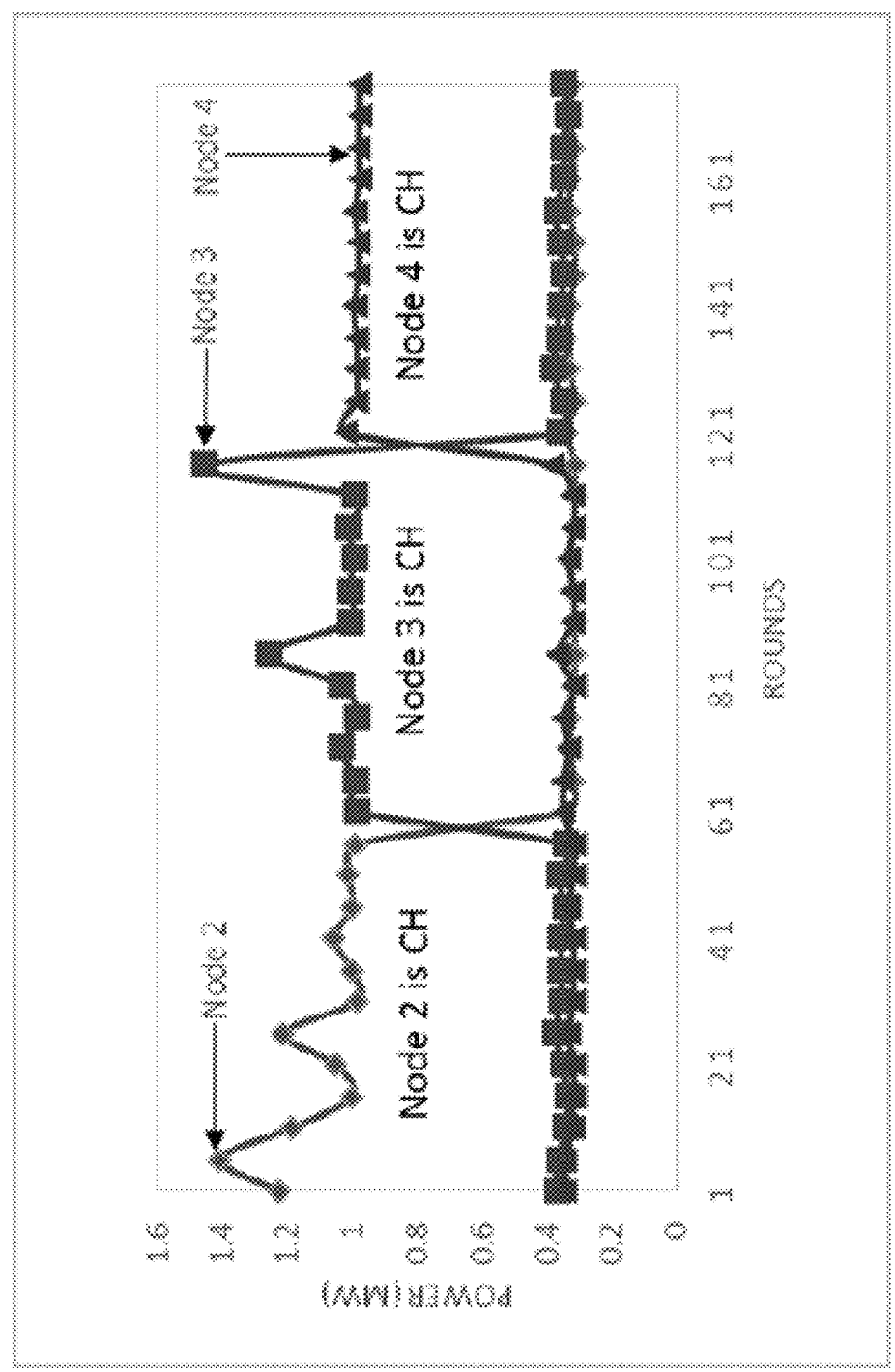
FIG. 18 is a graph illustrating the power consumption of the last three cluster nodes using the EDEM clustering approach according to one embodiment.
Figure 19:
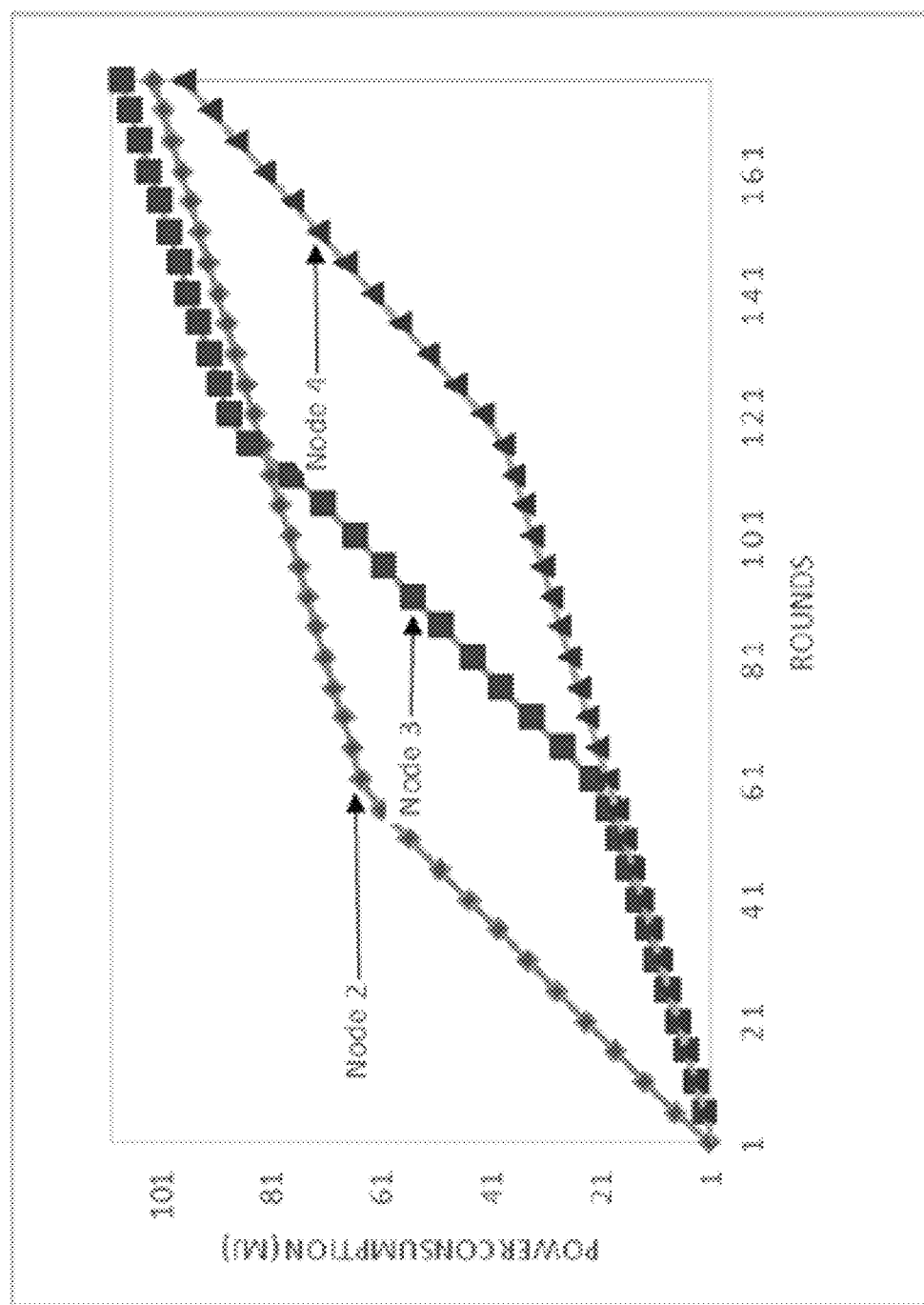
FIG. 19 is a graph illustrating the power consumption of the last three cluster nodes using the EDEM clustering approach according to one embodiment.

In contrast, FIGS. 18 and 19 are graphs illustrating the power consumption of the last cluster using the EDEM clustering approach when the pipeline length is 950 m and the number of deployed sensor nodes is 30. The power consumption of each sensor node within the cluster is varied over time. This occurs because the cluster head sensor node is in charge for a period of time, then it works as a normal sensor node. It is also observed that the cumulative power consumption at the end of the experiment approximately reached steady values for all cluster nodes. However, in the greedy HTL approach, the last sensor node still consumed the highest power over all time.

Figure 20:
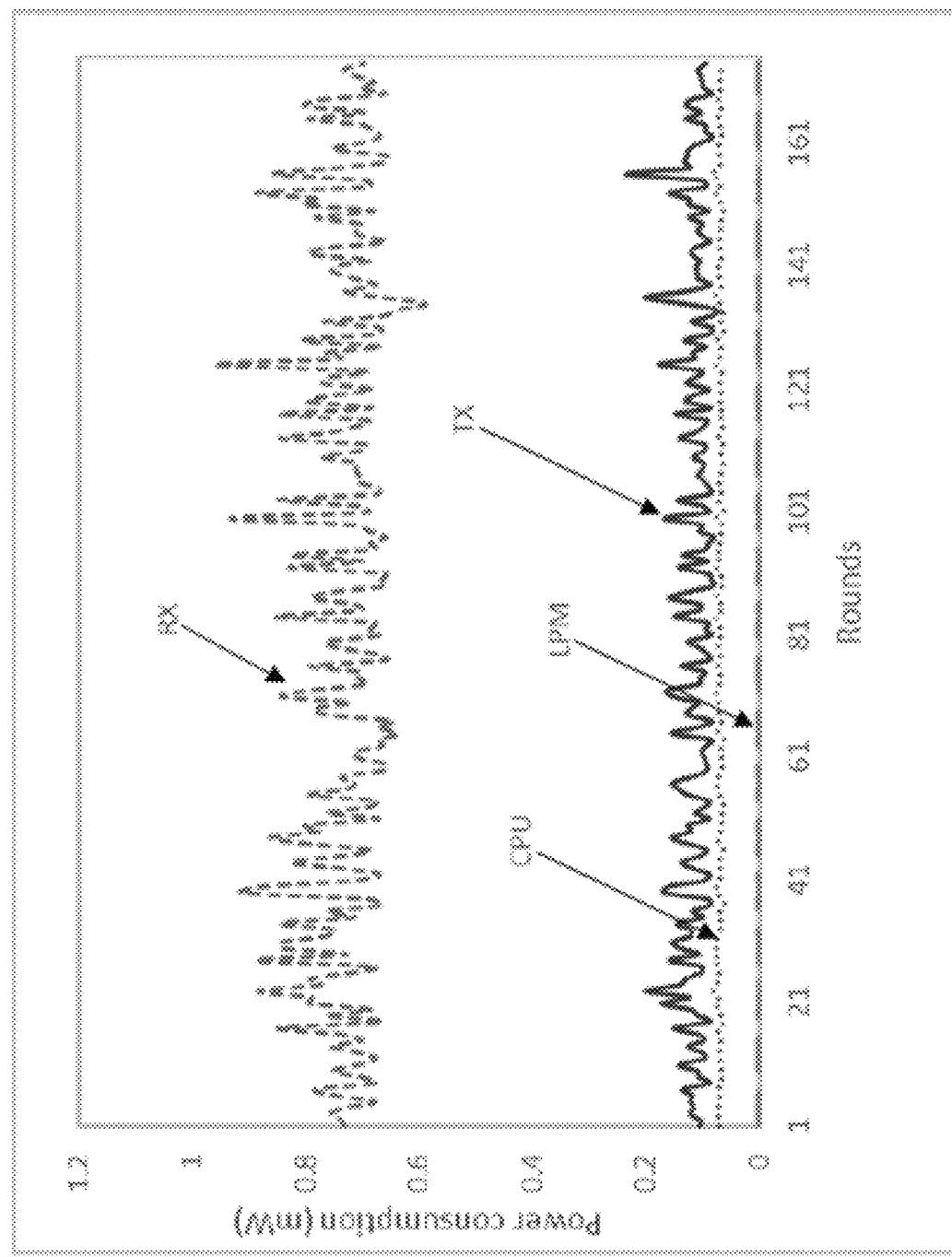
FIG. 20 is a graph illustrating the power consumption of each stage of the last sensor node in the greedy HTL approach according to one embodiment.

An analysis of the power consumption of each stage on sensor nodes was made. FIG. 20 is a graph illustrating the power consumption of each stage of the last sensor node in the greedy HTL approach. The graph of FIG. 20 is divided into four stages for the transmitting stage (TX), the receiving stage (RX), the LPM stage, and CPU stage. The first peak of the TX and CPU stages indicates the wake up of microcontroller unit, and the chip starts to do some pre-processing work, including message packaging and some hardware initiation. In the greedy HTL approach of FIG. 20, each stage works at the same power level and continues to consume more energy over time.

Figure 21:
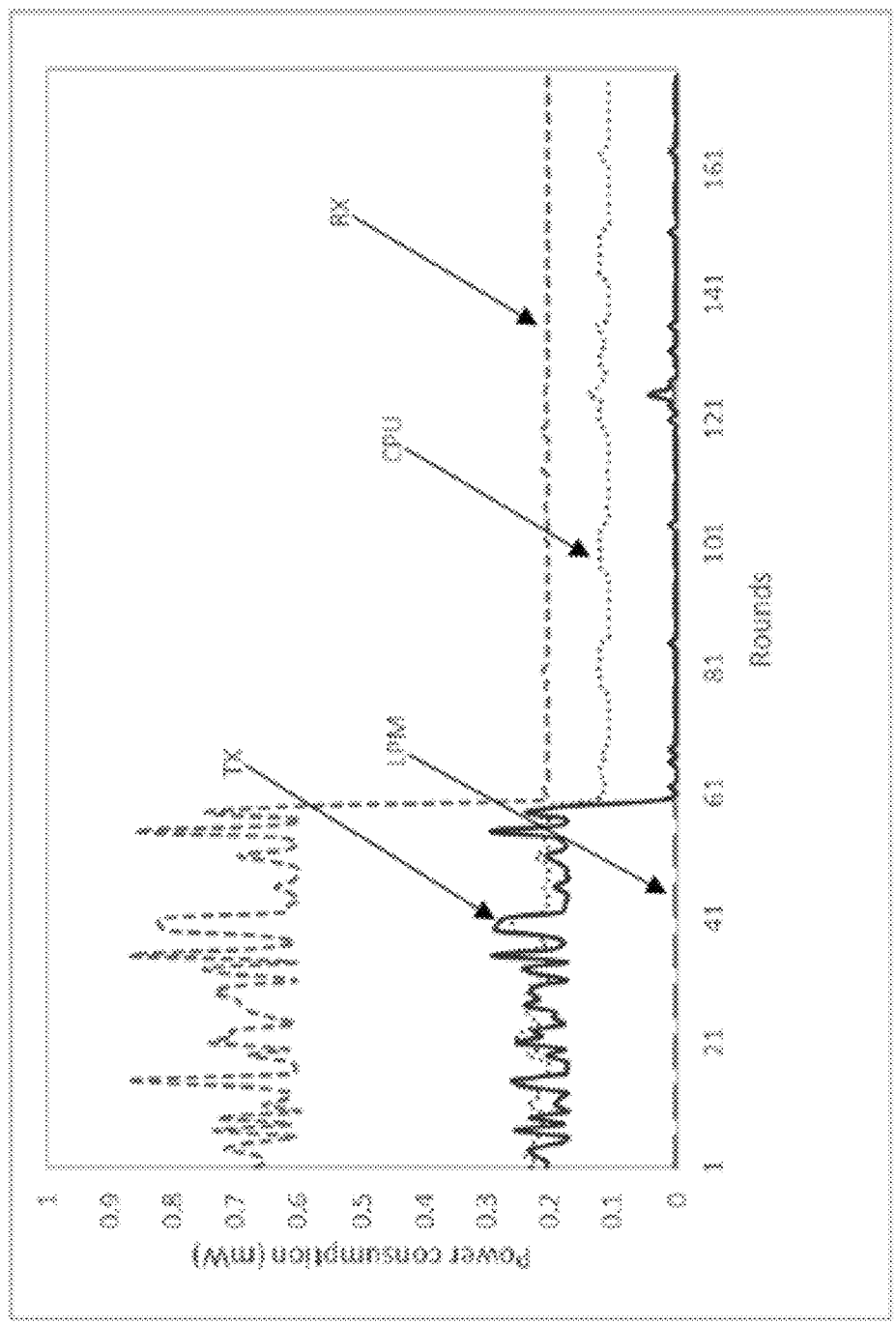
FIG. 21 is a graph illustrating the power consumption of each stage of the last sensor node in the EDEM clustering approach according to one embodiment.

In contrast, FIG. 21 is a graph illustrating the power consumption of each stage of the last sensor node in the EDEM clustering approach. The graph of FIG. 21 is divided into four stages for the transmitting stage (TX), the receiving stage (RX), the LPM stage, and CPU stage. In FIG. 21, the power consumption is varied from one stage to another over time. A cluster head sensor node consumes a large amount of power. However, other non-cluster head sensor nodes consume less power. This behavior results in a conservation of energy.

Figure 22:
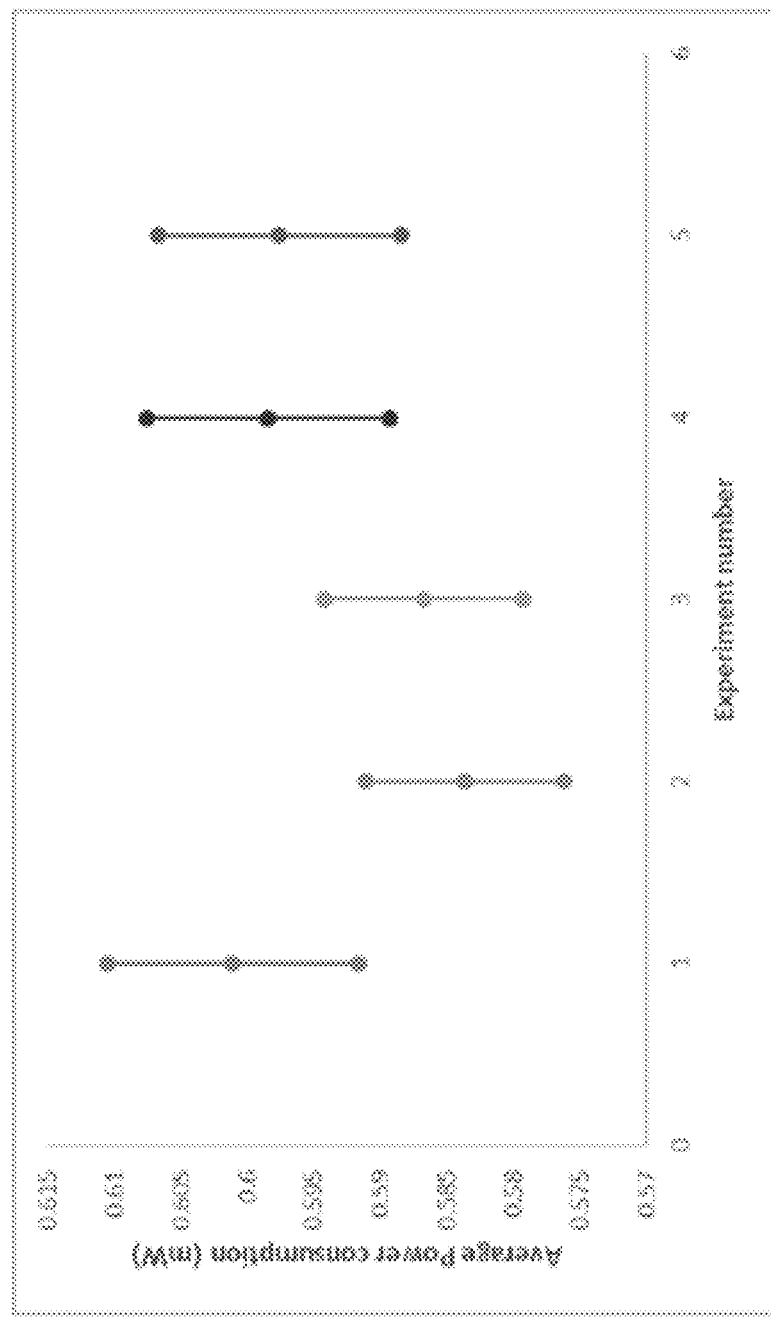
FIG. 22 is a graph illustrating confidence intervals of power consumption of the five experiments using the EDEM clustering approach according to one embodiment.

The experiments were replicated five times to verify results. FIG. 22 is a graph illustrating confidence intervals of power consumption of the five experiments using the EDEM clustering approach when the pipeline length was 950 m and the number of deployed sensor nodes was 30. The average power consumption was used in the experiments. The confidence intervals were calculated with a 95% degree of confidence.

Sensor node placement for in-line pipeline monitoring applications is a critical issue and has a major influence in the entire network performance, due to its effect on its scalability and lifetime. The advantages of the EDEM clustering technique has been used to investigate the lifetime and energy consumption of a WSN with the objective of maximizing the lifetime and reducing the energy consumption.

The EDEM clustering approach prominently clusters the sensor nodes based on their power levels to balance the loads for all of the sensor nodes within the same cluster. The simulation experiments conducted under several scenarios showed results of a 62% increase in the lifetime of a sensor node battery, compared with heuristic techniques. Real experiments were conducted to validate the simulation results. Results showed that the performance of the EDEM clustering approach outperformed the greedy HTL approach by 50%. The results also showed that the power consumption for the EDEM clustering approach was very power-efficient and more suitable for linear topology networks.

Figure 23:
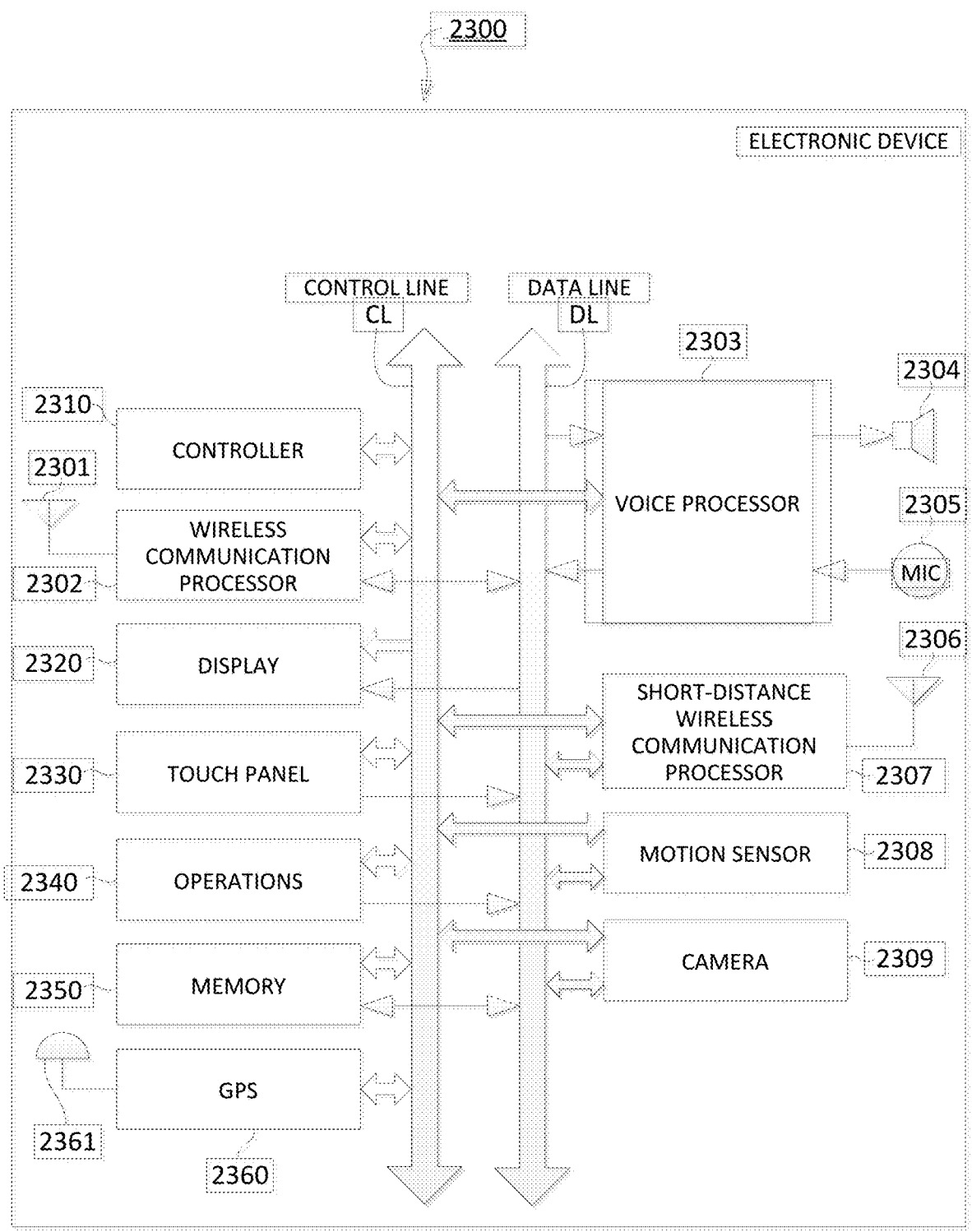
FIG. 23 is a block diagram illustrating an exemplary electronic device according to one embodiment.

FIG. 23 is a block diagram illustrating an exemplary electronic device used in accordance with embodiments of the present disclosure. In the embodiments, electronic device 2300 can be a smartphone, a laptop, a tablet, a server, an e-reader, a camera, a navigation device, etc. Electronic device 2300 could be used as one or more of the client devices 140 illustrated in FIG. 1B.

The exemplary electronic device 2300 of FIG. 23 includes a controller 2310 and a wireless communication processor 2302 connected to an antenna 2301. A speaker 2304 and a microphone 2305 are connected to a voice processor 2303. The controller 2310 can include one or more Central Processing Units (CPUs), and can control each element in the electronic device 2300 to perform functions related to communication control, audio signal processing, control for the audio signal processing, still and moving image processing and control, and other kinds of signal processing. The controller 2310 can perform these functions by executing instructions stored in a memory 2350. Alternatively or in addition to the local storage of the memory 2350, the functions can be executed using instructions stored on an external device accessed on a network or on a non-transitory computer readable medium.

The memory 2350 includes but is not limited to Read Only Memory (ROM), Random Access Memory (RAM), or a memory array including a combination of volatile and non-volatile memory units. The memory 2350 can be utilized as working memory by the controller 2310 while executing the processes and algorithms of the present disclosure. Additionally, the memory 2350 can be used for long-term storage, e.g., of image data and information related thereto.

The electronic device 2300 includes a control line CL and data line DL as internal communication bus lines. Control data to/from the controller 2310 can be transmitted through the control line CL. The data line DL can be used for transmission of voice data, display data, etc.

The antenna 2301 transmits/receives electromagnetic wave signals between base stations for performing radio-based communication, such as the various forms of cellular telephone communication. The wireless communication processor 2302 controls the communication performed between the electronic device 2300 and other external devices via the antenna 2301. For example, the wireless communication processor 2302 can control communication between base stations for cellular phone communication.

The speaker 2304 emits an audio signal corresponding to audio data supplied from the voice processor 2303. The microphone 2305 detects surrounding audio and converts the detected audio into an audio signal. The audio signal can then be output to the voice processor 2303 for further processing. The voice processor 2303 demodulates and/or decodes the audio data read from the memory 2350 or audio data received by the wireless communication processor 2302 and/or a short-distance wireless communication processor 2307. Additionally, the voice processor 2303 can decode audio signals obtained by the microphone 2305.

The exemplary electronic device 2300 can also include a display 2320, a touch panel 2330, an operations key 2340, and an antenna 2306 connected to the short-distance communication processor 2307. The display 2320 can be a Liquid Crystal Display (LCD), an organic electroluminescence display panel, or another display screen technology. In addition to displaying still and moving image data, the display 2320 can display operational inputs, such as numbers or icons which can be used for control of the electronic device 2300. The display 2320 can additionally display a GUI for a user to control aspects of the electronic device 2300 and/or other devices. Further, the display 2320 can display characters and images received by the electronic device 2300 and/or stored in the memory 2350 or accessed from an external device on a network. For example, the electronic device 2300 can access a network such as the Internet and display text and/or images transmitted from a Web server.

The touch panel 2330 can include a physical touch panel display screen and a touch panel driver. The touch panel 2330 can include one or more touch sensors for detecting an input operation on an operation surface of the touch panel display screen. The touch panel 2330 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 2330 can detect when the stylus approaches/contacts the operation surface of the touch panel display (similar to the case in which a finger is used for the touch operation).

According to aspects of the present disclosure, the touch panel 2330 can be disposed adjacent to the display 2320 (e.g., laminated) or can be formed integrally with the display 2320. For simplicity, the present disclosure assumes the touch panel 2330 is formed integrally with the display 2320 and therefore, examples discussed herein can describe touch operations being performed on the surface of the display 2320 rather than the touch panel 2330. However, the skilled artisan will appreciate that this is not limiting.

For simplicity, the present disclosure assumes the touch panel 2330 is a capacitance-type touch panel technology. However, it should be appreciated that aspects of the present disclosure can easily be applied to other touch panel types (e.g., resistance-type touch panels) with alternate structures. According to aspects of the present disclosure, the touch panel 2330 can include transparent electrode touch sensors arranged in the X-Y direction on the surface of transparent sensor glass.

The touch panel driver can be included in the touch panel 2330 for control processing related to the touch panel 2330, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. Signals can be transmitted by the touch panel driver, e.g. in response to a detection of a touch operation, in response to a query from another element based on timed data exchange, etc.

The touch panel 2330 and the display 2320 can be surrounded by a protective casing, which can also enclose the other elements included in the electronic device 2300. According to aspects of the disclosure, a position of the user's fingers on the protective casing (but not directly on the surface of the display 2320) can be detected by the touch panel 2330 sensors. Accordingly, the controller 2310 can perform display control processing described herein based on the detected position of the user's fingers gripping the casing. For example, an element in an interface can be moved to a new location within the interface (e.g., closer to one or more of the fingers) based on the detected finger position.

Further, according to aspects of the disclosure, the controller 2310 can be configured to detect which hand is holding the electronic device 2300, based on the detected finger position. For example, the touch panel 2330 sensors can detect a plurality of fingers on the left side of the electronic device 2300 (e.g., on an edge of the display 2320 or on the protective casing), and detect a single finger on the right side of the electronic device 2300. In this exemplary scenario, the controller 2310 can determine that the user is holding the electronic device 2300 with his/her right hand because the detected grip pattern corresponds to an expected pattern when the electronic device 2300 is held only with the right hand.

The operation key 2340 can include one or more buttons or similar external control elements, which can generate an operation signal based on a detected input by the user. In addition to outputs from the touch panel 2330, these operation signals can be supplied to the controller 2310 for performing related processing and control. According to aspects of the disclosure, the processing and/or functions associated with external buttons and the like can be performed by the controller 2310 in response to an input operation on the touch panel 2330 display screen rather than the external button, key, etc. In this way, external buttons on the electronic device 2300 can be eliminated in lieu of performing inputs via touch operations, thereby improving water-tightness.

The antenna 2306 can transmit/receive electromagnetic wave signals to/from other external apparatuses, and the short-distance wireless communication processor 2307 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 2307.

The electronic device 2300 can include a motion sensor 2308. The motion sensor 2308 can detect features of motion (i.e., one or more movements) of the electronic device 2300. For example, the motion sensor 2308 can include an accelerometer to detect acceleration, a gyroscope to detect angular velocity, a geomagnetic sensor to detect direction, a geo-location sensor to detect location, etc., or a combination thereof to detect motion of the electronic device 2300. According to aspects of the disclosure, the motion sensor 2308 can generate a detection signal that includes data representing the detected motion. For example, the motion sensor 2308 can determine a number of distinct movements in a motion (e.g., from start of the series of movements to the stop, within a predetermined time interval, etc.), a number of physical shocks on the electronic device 2300 (e.g., a jarring, hitting, etc., of the electronic device 2300), a speed and/or acceleration of the motion (instantaneous and/or temporal), or other motion features. The detected motion features can be included in the generated detection signal. The detection signal can be transmitted, e.g., to the controller 2310, whereby further processing can be performed based on data included in the detection signal. The motion sensor 2308 can work in conjunction with a Global Positioning System (GPS) 2360. The GPS 2360 detects the present position of the electronic device 2300. The information of the present position detected by the GPS 2360 is transmitted to the controller 2310. An antenna 2361 is connected to the GPS 2360 for receiving and transmitting signals to and from a GPS satellite.

Electronic device 2300 can include a camera 2309, which includes a lens and shutter for capturing photographs of the surroundings around the electronic device 2300. In an embodiment, the camera 2309 captures surroundings of an opposite side of the electronic device 2300 from the user. The images of the captured photographs can be displayed on the display panel 2320. A memory saves the captured photographs. The memory can reside within the camera 2309 or it can be part of the memory 2350. The camera 2309 can be a separate feature attached to the electronic device 2300 or it can be a built-in camera feature.

Figure 24:
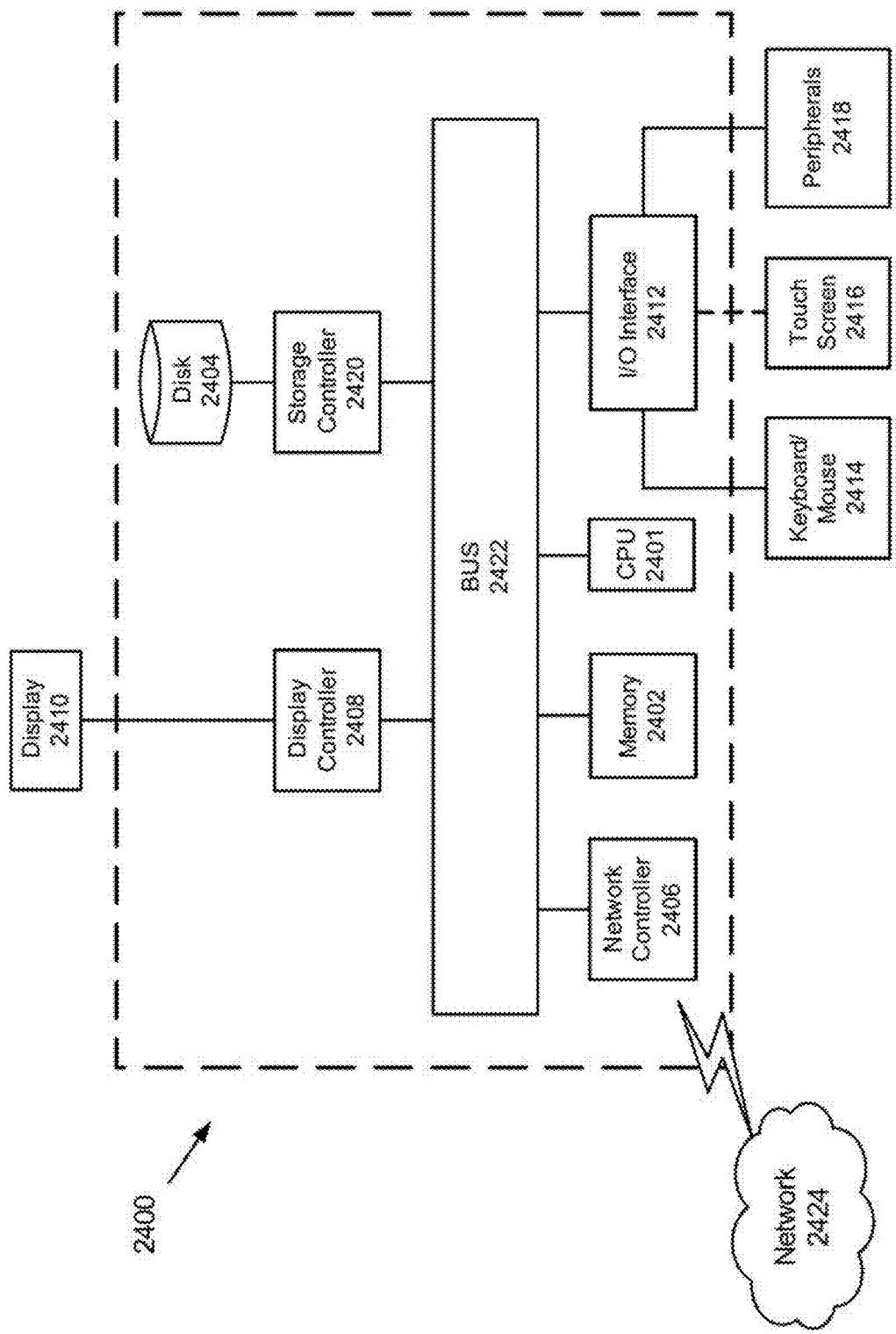
FIG. 24 is a block diagram of a hardware description of a computer according to one embodiment.

FIG. 24 is a block diagram of a hardware description of a computer 2400 used in exemplary embodiments. In the embodiments, computer 2400 can be a desk top, laptop, or server. Computer 2400 could be used as the server 130 or one or more of the client devices 140 illustrated in FIG. 1B.

In FIG. 24, the computer 2400 includes a CPU 2401 which performs the processes described herein. The process data and instructions may be stored in memory 2402. These processes and instructions may also be stored on a storage medium disk 2404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 2400 communicates, such as a server or computer.

Further, the claimed advancements may be provided as a utility application, background daemon, or component of an operating system, or combination thereof, executing in conjunction with CPU 2401 and an operating system such as Microsoft® Windows®, UNIX®, Oracle® Solaris, LINUX®, Apple macOS® and other systems known to those skilled in the art.

In order to achieve the computer 2400, the hardware elements may be realized by various circuitry elements, known to those skilled in the art. For example, CPU 2401 may be a Xenon® or Core® processor from Intel Corporation of America or an Opteron® processor from AMD of America, or may be other processor types that would be recognized by one of ordinary skill in the art. Alternatively, the CPU 2401 may be implemented on an FPGA, ASIC, PLD or using discrete logic circuits, as one of ordinary skill in the art would recognize. Further, CPU 2401 may be implemented as multiple processors cooperatively working in parallel to perform the instructions of the inventive processes described above.

The computer 2400 in FIG. 24 also includes a network controller 2406, such as an Intel Ethernet PRO network interface card from Intel Corporation of America, for interfacing with network 2424. As can be appreciated, the network 2424 can be a public network, such as the Internet, or a private network such as LAN or WAN network, or any combination thereof and can also include PSTN or ISDN sub-networks. The network 2424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 2400 further includes a display controller 2408, such as a NVIDIA® GeForce® GTX or Quadro® graphics adaptor from NVIDIA Corporation of America for interfacing with display 2410, such as a Hewlett Packard® HPL2445w LCD monitor. A general purpose I/O interface 2412 interfaces with a keyboard and/or mouse 2414 as well as an optional touch screen panel 2416 on or separate from display 2410. General purpose I/O interface 2412 also connects to a variety of peripherals 2418 including printers and scanners, such as an OfficeJet® or DeskJet® from Hewlett Packard.

The general purpose storage controller 2420 connects the storage medium disk 2404 with communication bus 2422, which may be an ISA, EISA, VESA, PCI, or similar, for interconnecting all of the components of the computer 2400. A description of the general features and functionality of the display 2410, keyboard and/or mouse 2414, as well as the display controller 2408, storage controller 2420, network controller 2406, and general purpose I/O interface 2412 is omitted herein for brevity as these features are known.

Figure 25:
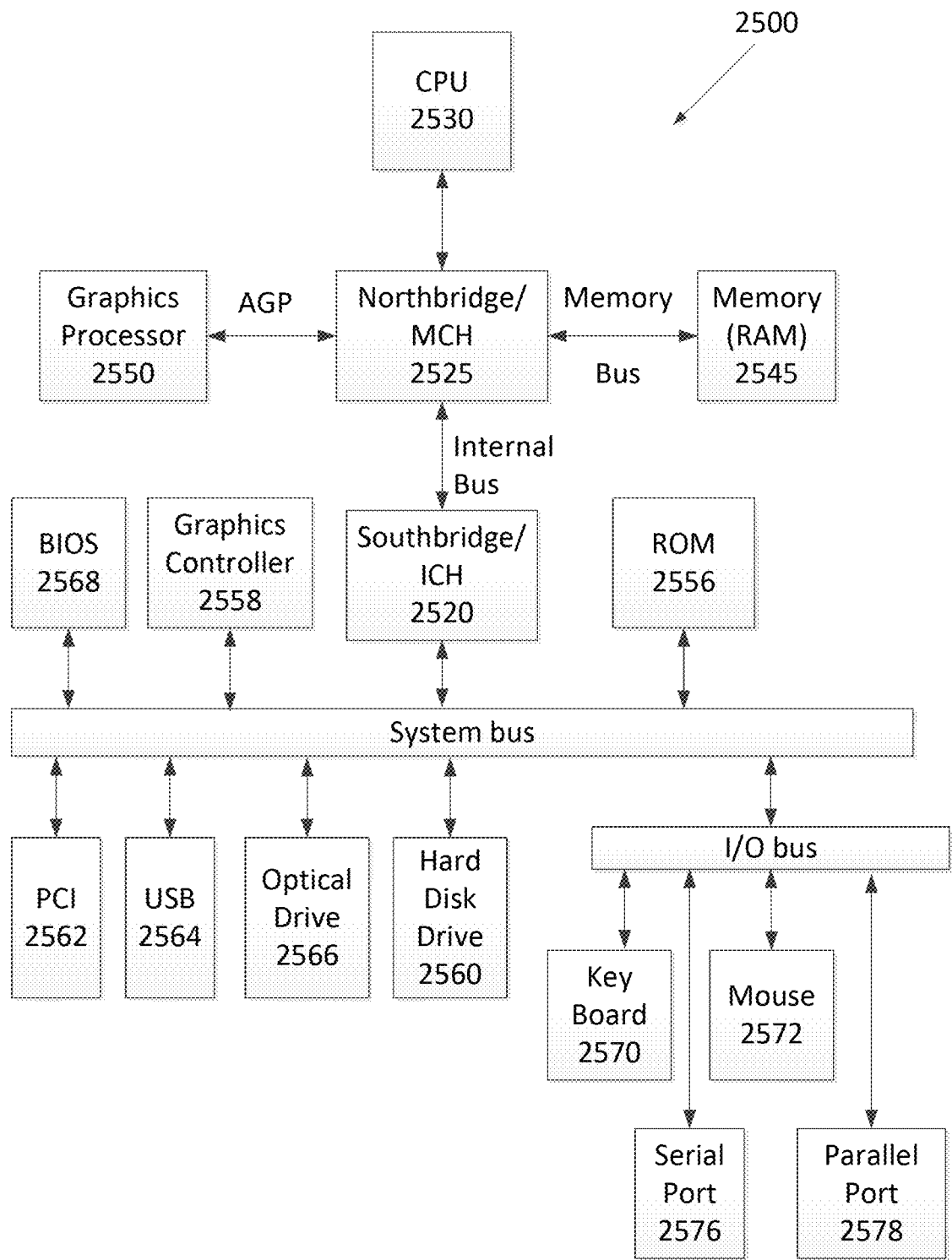
FIG. 25 is a schematic diagram of an exemplary data processing system according to one embodiment.

FIG. 25 is a schematic diagram of an exemplary data processing system. The data processing system is an example of a computer in which code or instructions implementing the processes of the illustrative embodiments can be located.

In FIG. 25, data processing system 2500 employs an application architecture including a north bridge and memory controller hub (NB/MCH) 2525 and a south bridge and input/output (I/O) controller hub (SB/ICH) 2520. The central processing unit (CPU) 2530 is connected to NB/MCH 2525. The NB/MCH 2525 also connects to the memory 2545 via a memory bus, and connects to the graphics processor 2550 via an accelerated graphics port (AGP). The NB/MCH 2525 also connects to the SB/ICH 2520 via an internal bus (e.g., a unified media interface or a direct media interface). The CPU 2530 can contain one or more processors and even can be implemented using one or more heterogeneous processor systems.

Figure 26:
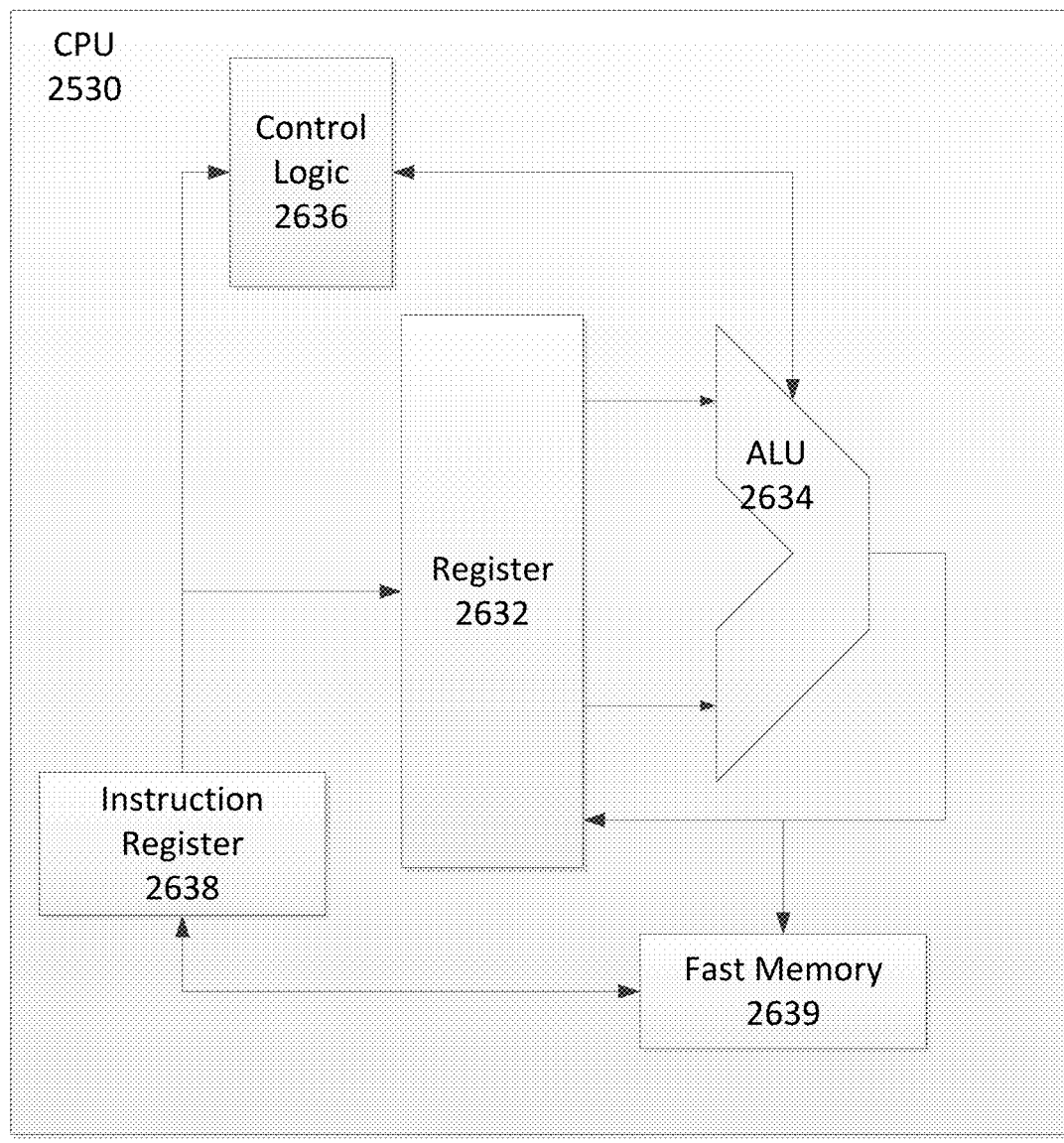
FIG. 26 illustrates an implementation of a CPU according to one embodiment.

FIG. 26 illustrates an implementation of CPU 2530. In one implementation, an instruction register 2638 retrieves instructions from a fast memory 2639. At least part of these instructions are fetched from an instruction register 2638 by a control logic 2636 and interpreted according to the instruction set architecture of the CPU 2530. Part of the instructions can also be directed to a register 2632. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 2634 that loads values from the register 2632 and performs logical and mathematical operations on the loaded values according to the instructions. The results from these operations can be fed back into the register 2632 and/or stored in a fast memory 2639. According to aspects of the disclosure, the instruction set architecture of the CPU 2530 can use a reduced instruction set computer (RISC), a complex instruction set computer (CISC), a vector processor architecture, or a very long instruction word (VLIW) architecture. Furthermore, the CPU 2530 can be based on the Von Neuman model or the Harvard model. The CPU 2530 can be a digital signal processor, an FPGA, an ASIC, a PLA, a PLD, or a CPLD. Further, the CPU 2530 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 25, the data processing system 2500 can include the SB/ICH 2520 being coupled through a system bus to an I/O Bus, a read only memory (ROM) 2556, universal serial bus (USB) port 2564, a flash binary input/output system (BIOS) 2568, and a graphics controller 2558. PCI/PCIe devices can also be coupled to SB/ICH 2520 through a PCI bus 2562.

The PCI devices can include, for example, Ethernet adapters, add-in cards, and PC cards for notebook computers. The Hard disk drive 2560 and CD-ROM 2566 can use, for example, an integrated drive electronics (IDE) or serial advanced technology attachment (SATA) interface. In one implementation the I/O bus can include a super I/O (SIO) device.

Further, the hard disk drive (HDD) 2560 and optical drive 2566 can also be coupled to the SB/ICH 2520 through a system bus. In one implementation, a keyboard 2570, a mouse 2572, a parallel port 2578, and a serial port 2576 can be connected to the system bus through the I/O bus. Other peripherals and devices can be connected to the SB/ICH 2520 using a mass storage controller such as SATA or PATA, an Ethernet port, an ISA bus, a LPC bridge, SMBus, a DMA controller, and an Audio Codec.

Figure 27:
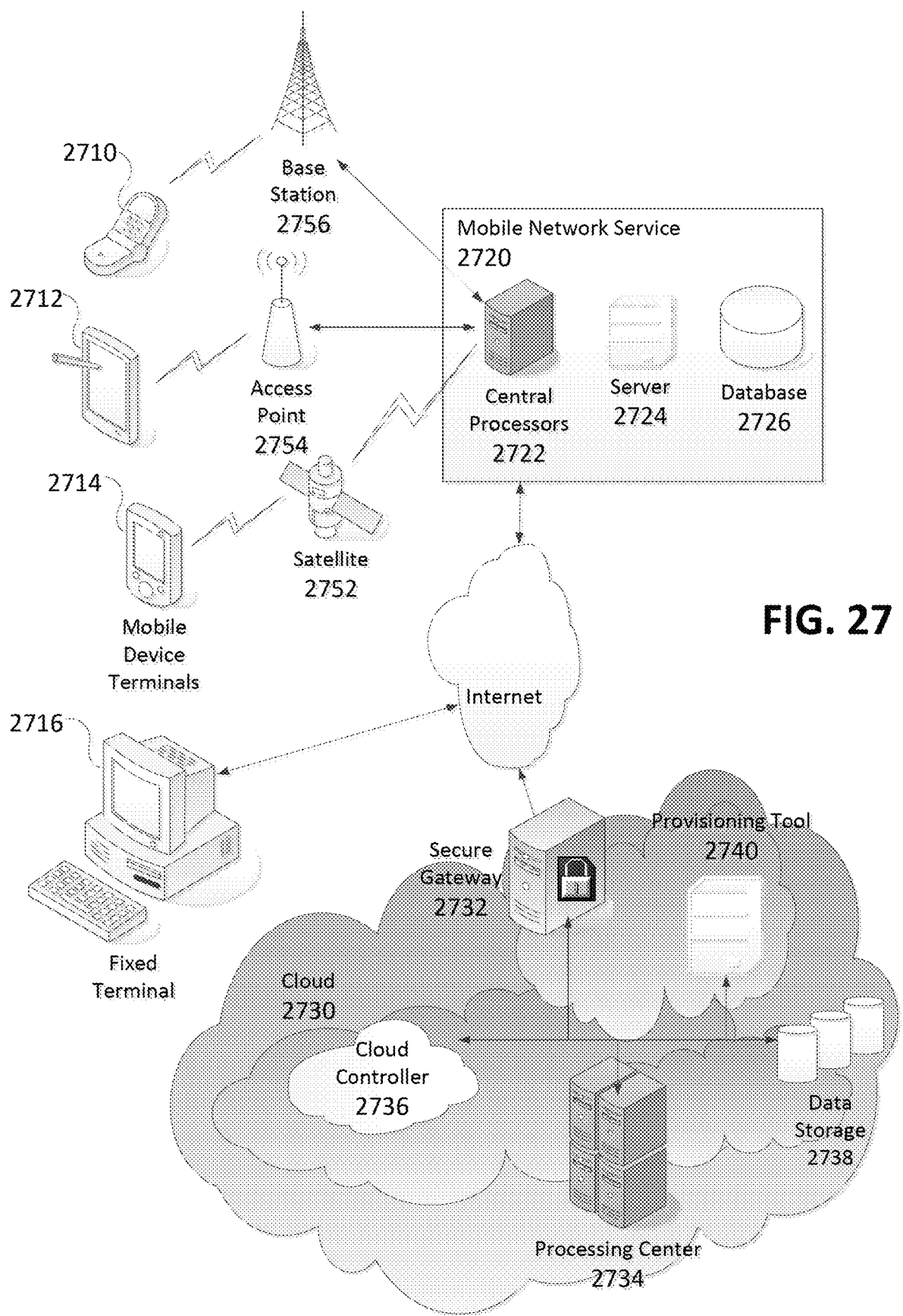
FIG. 27 illustrates an exemplary cloud computing system according to one embodiment.

FIG. 27 illustrates an exemplary cloud computing system, wherein users access the cloud through mobile device terminals or fixed terminals that are connected to the Internet. One or more of the devices illustrated in the WSN architecture 100 of FIG. 1B could be used in the cloud computing system illustrated in FIG. 27.

The mobile device terminals can include a cell phone 2710, a tablet computer 2712, and a smartphone 2714, for example. The mobile device terminals can connect to a mobile network service 2720 through a wireless channel such as a base station 2756 (e.g., an Edge, 3G, 4G, or LTE Network), an access point 2754 (e.g., a femto cell or WiFi network), or a satellite connection 2752. In one implementation, signals from the wireless interface to the mobile device terminals (e.g., the base station 2756, the access point 2754, and the satellite connection 2752) are transmitted to a mobile network service 2720, such as an EnodeB and radio network controller, UMTS, or HSDPA/HSUPA. Mobile users' requests and information are transmitted to central processors 2722 that are connected to servers 2724 to provide mobile network services, for example. Further, mobile network operators can provide service to mobile users for authentication, authorization, and accounting based on home agent and subscribers' data stored in databases 2726, for example. The subscribers' requests are subsequently delivered to a cloud 2730 through the Internet.

A user can also access the cloud through a fixed terminal 2716, such as a desktop or laptop computer or workstation that is connected to the Internet via a wired network connection or a wireless network connection. The mobile network service 2720 can be a public or a private network such as an LAN or WAN network. The mobile network service 2720 can be wireless such as a cellular network including EDGE, 3G and 4G wireless cellular systems. The wireless mobile network service 2720 can also be Wi-Fi, Bluetooth, or any other wireless form of communication that is known.

The user's terminal, such as a mobile user terminal and a fixed user terminal, provides a mechanism to connect via the Internet to the cloud 2730 and to receive output from the cloud 2730, which is communicated and displayed at the user's terminal. In the cloud 2730, a cloud controller 2736 processes the request to provide users with the corresponding cloud services. These services are provided using the concepts of utility computing, virtualization, and service-oriented architecture.

In one implementation, the cloud 2730 is accessed via a user interface such as a secure gateway 2732. The secure gateway 2732 can for example, provide security policy enforcement points placed between cloud service consumers and cloud service providers to interject enterprise security policies as the cloud-based resources are accessed. Further, the secure gateway 2732 can consolidate multiple types of security policy enforcement, including for example, authentication, single sign-on, authorization, security token mapping, encryption, tokenization, logging, alerting, and API control. The cloud 2730 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 2740 that prepares and equips the cloud resources, such as the processing center 2734 and data storage 2738 to provide services to the users of the cloud 2730. The processing center 2734 can be a computer duster, a data center, a main frame computer, or a server farm. In one implementation, the processing center 2734 and data storage 2738 are collocated.

Embodiments described herein can be implemented in conjunction with one or more of the devices described above with reference to FIGS. 23-27. Embodiments are a combination of hardware and software, and circuitry by which the software is implemented.

FIG. 28 is a flowchart for a method 2800 of sensor node data transfer. Method 2800 is executed using the WSN 100 described with reference to FIG. 1B. WSN 100 includes the server 130, the gateway sensor node 120, and the plurality of sensor nodes 110. WSN 100 has circuitry configured to execute method 2800 according to embodiments described herein.

In step S2810, a sensor node from a first cluster of sensor nodes is assigned as a first head sensor node of the first cluster. This can be determined by a battery charge level of the first head sensor node. The first cluster is positioned along a first segment of a pipeline. The pipeline can be a water pipeline, a petrochemical pipeline such as an oil or gas pipeline, or other fluid-carrying pipeline.

In step S2820, one or more sensor data packets are forwarded from each remaining sensor node of the first cluster to the first head sensor node. In one embodiment, the sensor nodes are equally spaced apart from their adjacent sensor nodes within the first segment.

In step S2830, the one or more sensor data packets are forwarded from the first head sensor node to a second head sensor node of a second cluster of sensor nodes in a direction of a controlling base station. The second cluster of sensor nodes is positioned along a second segment of the pipeline.

In step S2840, a replacement first head sensor node is elected from remaining sensor nodes of the first cluster when an energy level of the first head sensor node reaches a predetermined level. The replacement first head sensor node can be elected based upon its available battery charge level.

In step S2850, an energy status of the first head sensor node is forwarded to the replacement first head sensor node.

Embodiments described herein determine where to place SNs along a pipeline efficiently and to determine the number of members in each cluster. The power efficient deployment provides maximum lifetime of the sensor node battery, it minimizes the power consumption, and it obtains a needed fidelity.

A cluster head is elected based upon either the energy budget of the cluster head or a predefined time period, such as one day. If the energy of the cluster head reaches a threshold, such as a certain percentage of its energy budget, it sends an announcement to adjacent SNs to elect one of them as the cluster head. This process continues until all member SNs have acted as a cluster head, then the process is repeated.

Embodiments described herein include the following aspects.

(1) A method of sensor node data transfer includes assigning a sensor node from a first cluster of sensor nodes as a first head sensor node of the first cluster, wherein the first cluster is positioned along a first segment of a pipeline; forwarding one or more sensor data packets from each remaining sensor node of the first cluster to the first head sensor node; forwarding the one or more sensor data packets from the first head sensor node to a second head sensor node of a second cluster of sensor nodes positioned along a second segment of the pipeline in a direction of a controlling base station; electing a replacement first head sensor node from the remaining sensor nodes of the first cluster when an energy level of the first head sensor node reaches a predetermined level; and forwarding an energy status of the first head sensor node to the replacement first head sensor node.

(2) The method of sensor node data transfer of (1), wherein a length of the first segment and a length of the second segment does not exceed a maximum transmission range of each sensor node within the respective first segment and the second segment.

(3) The method of sensor node data transfer of either one of (1) or (2), wherein a distance between two adjacent sensor nodes is within a predetermined fidelity range of detecting a leakage signal from one of the adjacent sensor nodes.

(4) The method of sensor node data transfer of any one of (1) through (3), wherein a total number of clusters of sensor nodes is determined by a total length of the pipeline divided by a maximum transmission range of each of the sensor nodes.

(5) The method of sensor node data transfer of any one of (1) through (4), wherein a total power consumption of the first cluster includes an intra power consumed by the sensor nodes within the first cluster and an inter power consumed by the first head sensor node of the first cluster.

(6) The method of sensor node data transfer of any one of (1) through (5), wherein the predetermined level comprises a minimum battery charge level to forward the one or more sensor data packets towards the controlling base station.

(7) The method of sensor node data transfer of any one of (1) through (6), wherein a number of sensor nodes within the first cluster is equal to a number of sensor nodes within the second cluster.

(8) The method of sensor node data transfer of any one of (1) through (7), wherein the sensor nodes within the first cluster are equally spaced within the first segment of the pipeline, and the sensor nodes within the second cluster are equally spaced within the second segment of the pipeline.

(9) A wireless sensor network (WSN) includes a sensor node cluster having a plurality of sensor nodes positioned along a section of a pipeline; a base station; a designated cluster head for the sensor node cluster, the designated cluster head configured to forward sensor data packets towards the base station; and a server having circuitry. The circuitry is configured to determine when the designated cluster head has a battery energy level below a predetermined level, elect a replacement cluster head for the designated cluster head when the battery energy level is below the predetermined level, and forward an energy status of the designated cluster head to the replacement cluster head.

(10) The WSN of (9), wherein a length of the section of the pipeline does not exceed a maximum transmission range of any of the plurality of sensor nodes.

(11) The WSN of either one of (9) or (10), wherein a distance between two adjacent sensor nodes of the plurality of sensor nodes is within a predetermined fidelity range of detecting a leakage signal from one of the adjacent sensor nodes.

(12) The WSN of any one of (9) through (11), wherein a total number of sensor node clusters is determined by a total length of the pipeline divided by a maximum transmission range of each sensor node of the plurality of sensor nodes.

(13) The WSN of any one of (9) through (12), wherein a total power consumption of the first cluster includes an intra power consumed by each sensor node of the plurality of sensor nodes within the sensor node cluster and an inter power consumed by the designated cluster head of the sensor node cluster.

(14) The WSN of any one of (9) through (13), wherein the predetermined level comprises a minimum battery charge level to forward the sensor data packets towards the base station.

(15) The WSN of any one of (9) through (14), further includes a plurality of sensor node clusters positioned along respective sections of the pipeline; and a designated cluster head for each of the plurality of sensor node clusters.

(16) The WSN of any one of (9) through (15), wherein a number of sensor nodes within a first sensor node cluster positioned along a first segment of the pipeline is equal to a number of sensor nodes within a second sensor node cluster positioned along a second segment of the pipeline.

(17) The WSN of any one of (9) through (16), wherein the sensor nodes within the first sensor node cluster are equally spaced within the first segment of the pipeline, and the sensor nodes within the second sensor node cluster are equally spaced within the second segment of the pipeline.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A wireless sensor network (WSN), comprising:
a first sensor node cluster having a first plurality of sensor nodes containing 30-300 sensor nodes positioned along a first section of a fluid carrying pipeline having a length of 950-9,500 meters, each sensor node generating sensor data packets representing fluid leakage in the first section of the fluid carrying pipeline;
a base station;
a first designated cluster head for the first sensor node cluster, the first designated cluster head configured to forward first sensor data packets to a second designated cluster head of a second physically connected section in the direction of the base station; and
a server having circuitry configured to
determine when a designated cluster head has a battery energy level below a predetermined level,
elect a replacement cluster head for the designated cluster head when the battery energy level is below the predetermined level, and
forward an energy status of the designated cluster head to the replacement cluster head.

2. The WSN of claim 1, wherein a length of the section of the fluid carrying pipeline does not exceed a maximum transmission range of any of the plurality of sensor nodes.

3. The WSN of claim 1, wherein a distance between two adjacent sensor nodes of the plurality of sensor nodes of a segment is within a predetermined fidelity range of detecting a fluid leakage signal from one of the adjacent sensor nodes.

4. The WSN of claim 1, wherein a total number of sensor node clusters is determined by a total length of the fluid carrying pipeline divided by a maximum transmission range of each sensor node of the plurality of sensor nodes.

5. The WSN of claim 1, wherein a total power consumption of the first cluster includes an intra power consumed by each sensor node of the plurality of sensor nodes within the sensor node cluster and an inter power consumed by the designated cluster head of the sensor node cluster.

6. The WSN of claim 1, wherein the predetermined level comprises a minimum battery charge level needed to forward the sensor data packets towards the second designated cluster head.

7. The WSN of claim 1, further comprising:
a plurality of sensor node clusters positioned along respective physically connected sections of the fluid carrying pipeline; and
a designated cluster head for each of the plurality of sensor node clusters.

8. The WSN of claim 7, wherein a number of sensor nodes within a first sensor node cluster positioned along a first segment of the fluid carrying pipeline is equal to a number of sensor nodes within a second sensor node cluster positioned along a second segment of the fluid carrying pipeline.

9. The WSN of claim 8, wherein each one of the sensor nodes within the first cluster is equally spaced from each other sensor node within the first segment of the fluid carrying pipeline, and each one of the sensor nodes within the second cluster is equally spaced from each other sensor node within the second segment of the fluid carrying pipeline.

* * * * *